US012335450B2

(12) United States Patent
Igarashi

(10) Patent No.: US 12,335,450 B2
(45) Date of Patent: Jun. 17, 2025

(54) ENCODING APPARATUS, ENCODING METHOD, AND STORAGE MEDIUM

(71) Applicant: CANON KABUSHIKI KAISHA, Tokyo (JP)

(72) Inventor: Susumu Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 17/584,527

(22) Filed: Jan. 26, 2022

(65) Prior Publication Data

US 2022/0247886 A1 Aug. 4, 2022

(30) Foreign Application Priority Data

Feb. 4, 2021 (JP) .................. 2021-016887

(51) Int. Cl.
H04N 1/417 (2006.01)
H04N 19/107 (2014.01)
H04N 19/182 (2014.01)

(52) U.S. Cl.
CPC ........... *H04N 1/417* (2013.01); *H04N 19/107* (2014.11); *H04N 19/182* (2014.11)

(58) Field of Classification Search
CPC .... H04N 1/417; H04N 19/136; H04N 19/182; H04N 19/107
See application file for complete search history.

(56) References Cited

U.S. PATENT DOCUMENTS

| 5,848,194 | A | 12/1998 | Ishizuka et al. |
| 6,603,413 | B2 | 8/2003 | Igarashi et al. |
| 6,947,602 | B2 | 9/2005 | Igarashi et al. |
| 6,993,202 | B2 | 1/2006 | Igarashi et al. |
| 7,127,119 | B2 | 10/2006 | Igarashi |
| 7,218,788 | B2 | 5/2007 | Igarashi et al. |
| 8,478,079 | B2 | 7/2013 | Igarashi |
| 8,891,621 | B2 | 11/2014 | Igarashi |
| 9,066,101 | B2 | 6/2015 | Igarashi et al. |
| 9,948,944 | B2 | 4/2018 | Igarashi |

(Continued)

FOREIGN PATENT DOCUMENTS

JP 2019-186910 A 10/2019

OTHER PUBLICATIONS

Tang, Xiaodong, et al. "A high-dynamic range CMOS camera based on dual-gain channels." Journal of Real-Time Image Processing 17 (2020): 703-712. (Year: 2020).*

*Primary Examiner* — Vu Le
*Assistant Examiner* — Tracy Mangialaschi
(74) *Attorney, Agent, or Firm* — Venable LLP

(57) ABSTRACT

An obtaining unit obtains a plurality of first pixel values and a plurality of second pixel values generated by an image sensor and corresponding to a plurality of pixels. A first gain is applied to each of the plurality of first pixel values and a second gain greater than the first gain is applied to each of the plurality of second pixel values. An encoding unit encodes each of a plurality of target pixel values on the basis of a correlation with a reference pixel value corresponding to a same pixel among a plurality of reference pixel values. The plurality of target pixel is one of the plurality of first pixel values and the plurality of second pixel values, and the plurality of reference pixel values is the other of the plurality of first pixel values and the plurality of second pixel values.

19 Claims, 15 Drawing Sheets

(56) References Cited

U.S. PATENT DOCUMENTS

| | | |
|---|---|---|
| 11,133,339 B2 | 9/2021 | Yamashita et al. |
| 2007/0074266 A1* | 3/2007 | Raveendran ......... H04N 19/172 |
| | | 725/94 |
| 2011/0200263 A1* | 8/2011 | Ogawa ................... H04N 19/61 |
| | | 382/233 |
| 2019/0319056 A1 | 10/2019 | Yamashita et al. |
| 2020/0334864 A1* | 10/2020 | Liu ....................... H04N 19/186 |
| 2021/0366959 A1 | 11/2021 | Yamashita et al. |

* cited by examiner

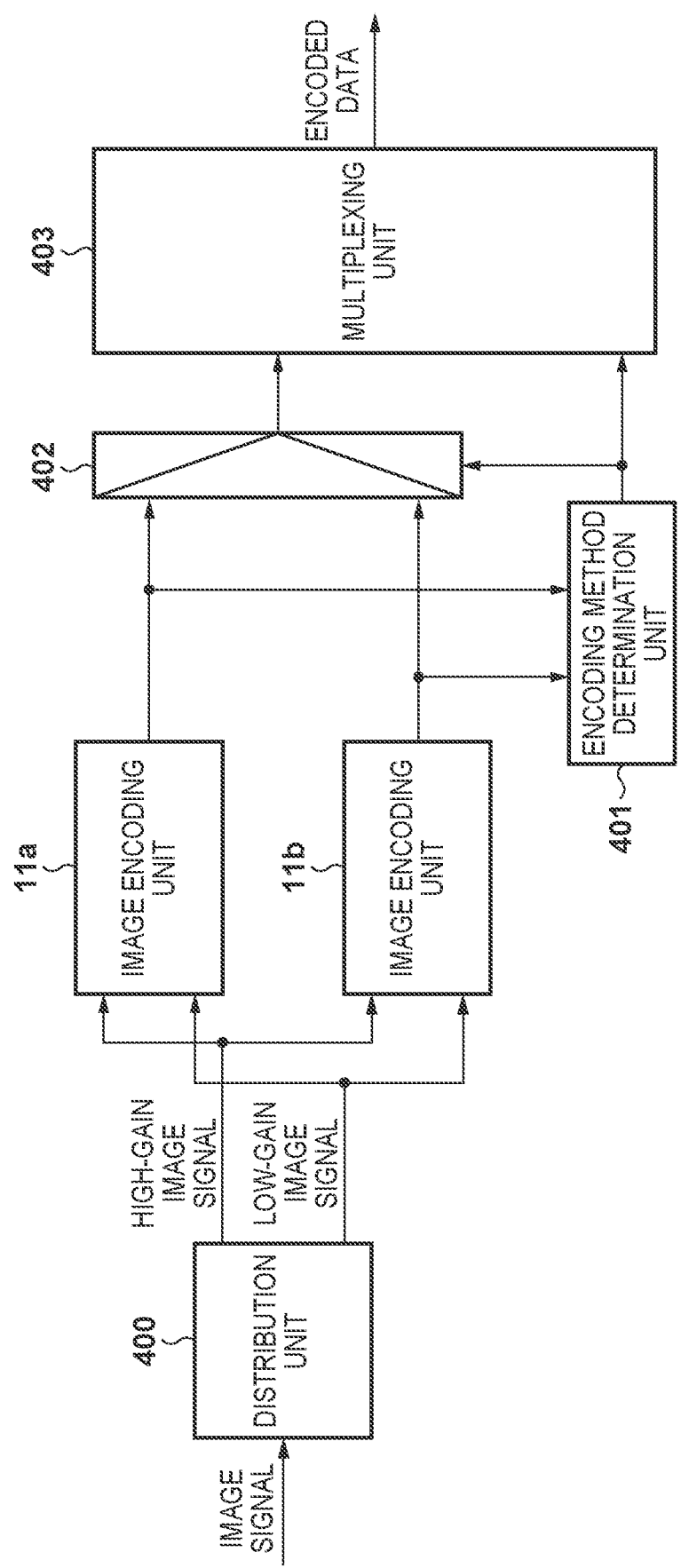

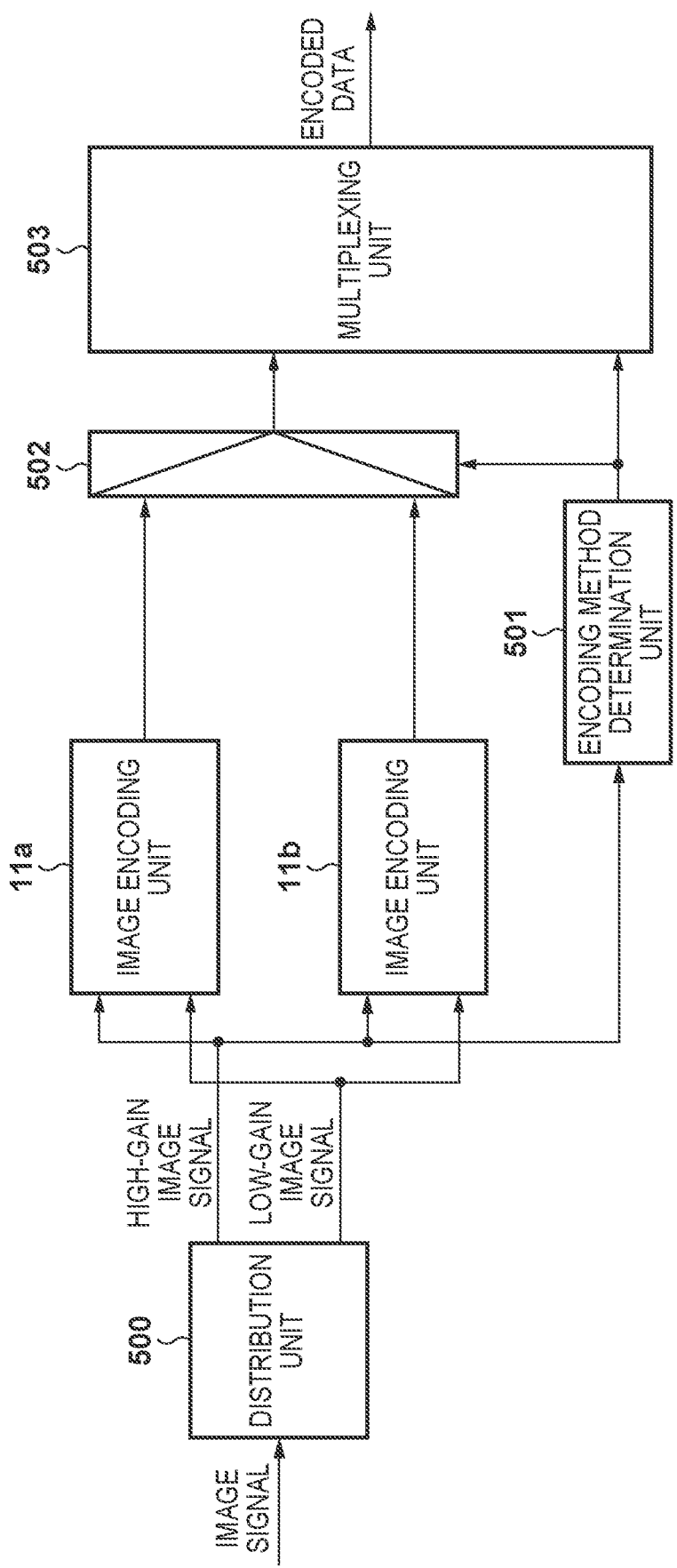

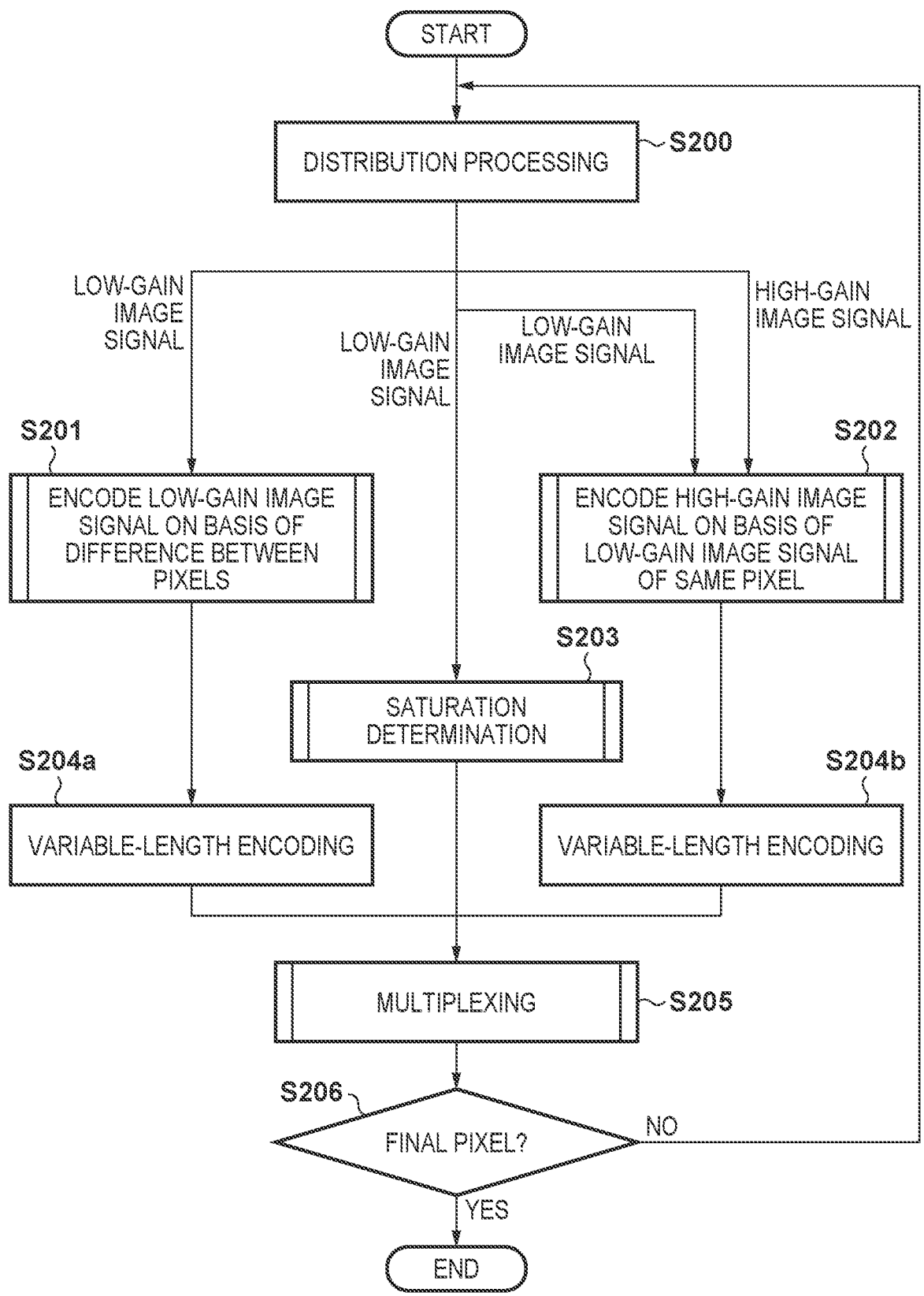

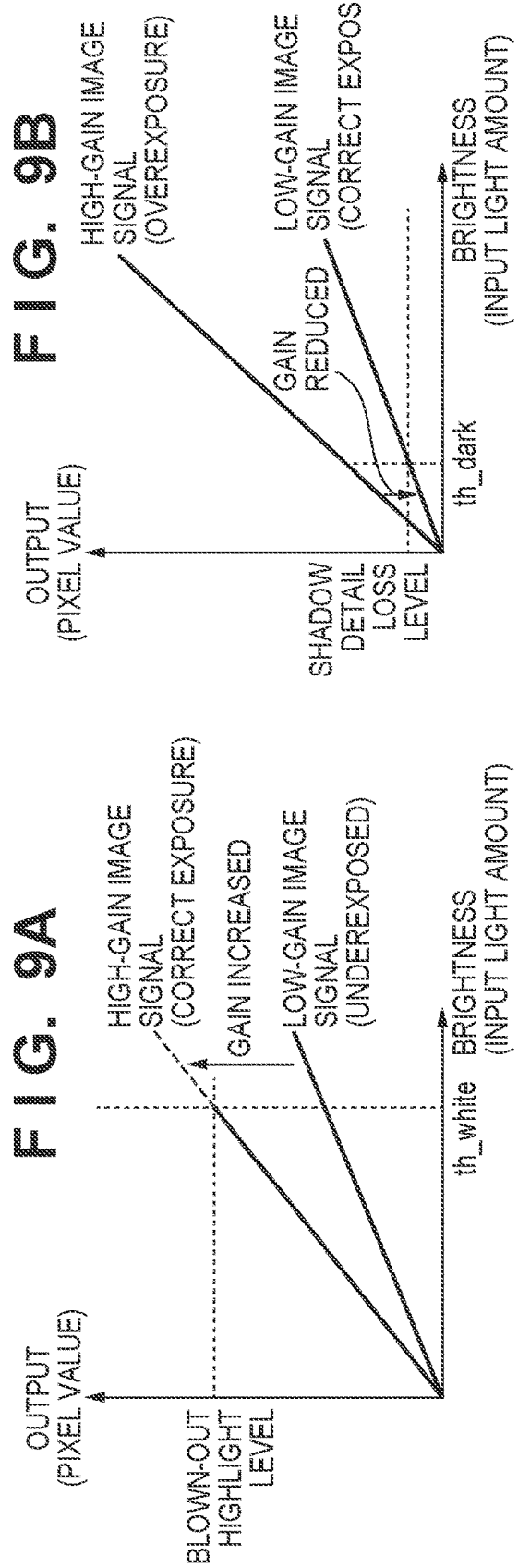
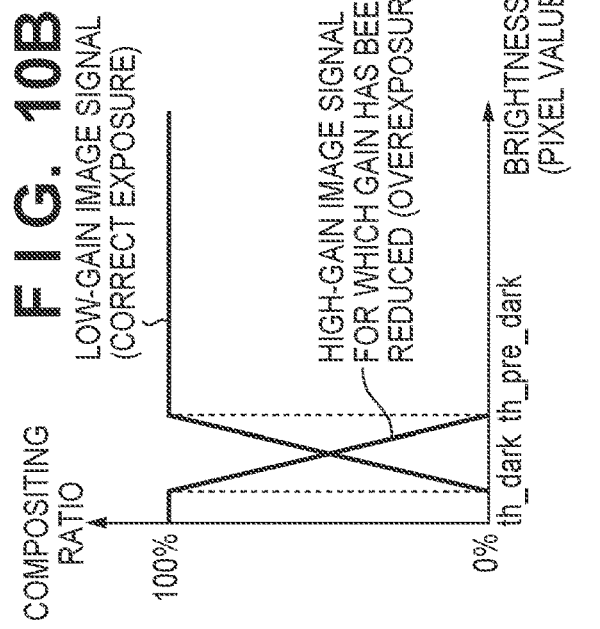
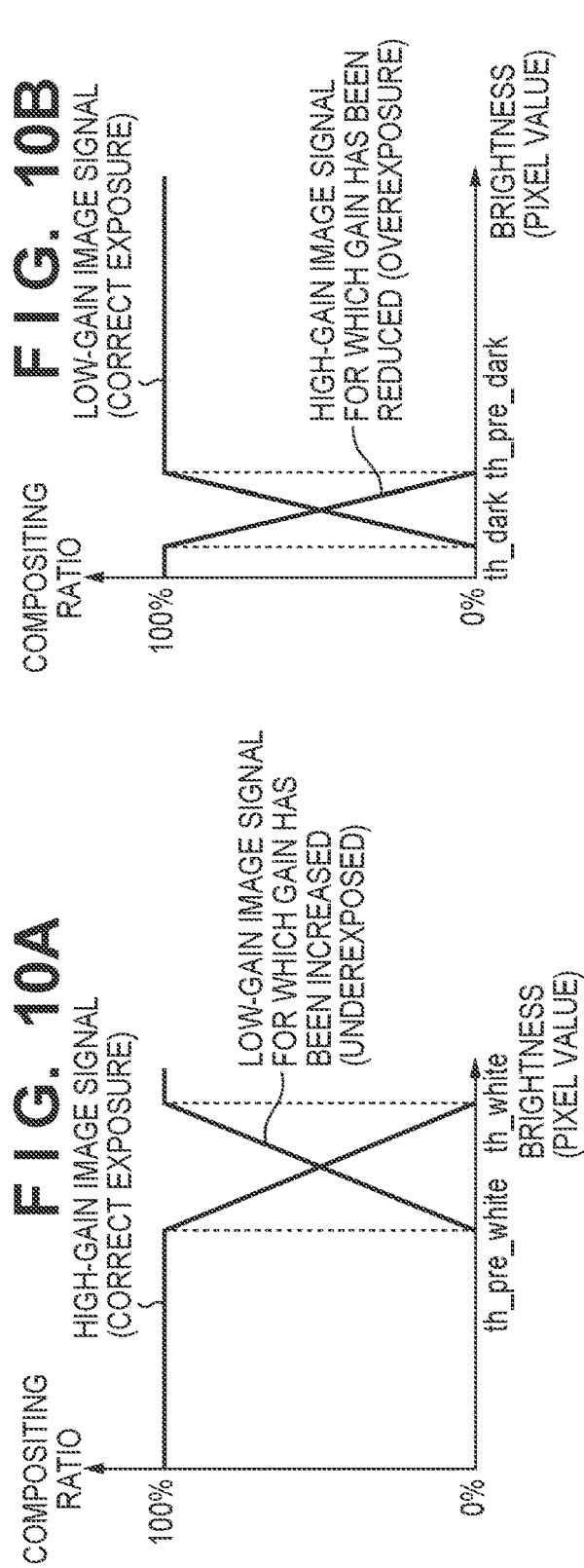

ENCODING APPARATUS, ENCODING METHOD, AND STORAGE MEDIUM

BACKGROUND OF THE INVENTION

Field of the Invention

The present invention relates to an encoding apparatus, an encoding method, and a storage medium.

Description of the Related Art

Recently, techniques have been proposed in which an image sensor not only simply outputs image signals obtained through photoelectric conversion in pixels, but also outputs image signals necessary for expanding the dynamic range, for example. Japanese Patent Laid-Open No. 2019-186910 discloses a technique in which an image signal amplified using different gains (high gain and low gain) can be read out in a short period of time.

However, an image sensor that reads out such image signals necessary for dynamic range expansion in a short period of time uses an image signal amplified using a plurality of different gains, and thus the amount of data output per pixel is twice as high as with a conventional image sensor. This increases the amount of traffic between the image sensor and an image processing engine connected to the image sensor.

SUMMARY OF THE INVENTION

Having been conceived of in light of such circumstances, the present invention provides a technique for reducing an amount of data by efficiently encoding an image signal amplified using a plurality of different gains.

According to a first aspect of the present invention, there is provided an encoding apparatus, comprising: an obtaining unit configured to obtain a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and an encoding unit configured to encode each of a plurality of target pixel values on the basis of a correlation with a reference pixel value corresponding to a same pixel among a plurality of reference pixel values, wherein the plurality of target pixel is one of the plurality of first pixel values and the plurality of second pixel values, and the plurality of reference pixel values is the other of the plurality of first pixel values and the plurality of second pixel values.

According to a second aspect of the present invention, there is provided an encoding method executed by an encoding apparatus, comprising: obtaining a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and encoding each of a plurality of target pixel values on the basis of a correlation with a reference pixel value corresponding to a same pixel among a plurality of reference pixel values, wherein the plurality of target pixel is one of the plurality of first pixel values and the plurality of second pixel values, and the plurality of reference pixel values is the other of the plurality of first pixel values and the plurality of second pixel values.

According to a third aspect of the present invention, there is provided a non-transitory computer-readable storage medium which stores a program for causing a computer to execute an encoding method comprising: obtaining a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and encoding each of a plurality of target pixel values on the basis of a correlation with a reference pixel value corresponding to a same pixel among a plurality of reference pixel values, wherein the plurality of target pixel is one of the plurality of first pixel values and the plurality of second pixel values, and the plurality of reference pixel values is the other of the plurality of first pixel values and the plurality of second pixel values.

Further features of the present invention will become apparent from the following description of exemplary embodiments with reference to the attached drawings.

BRIEF DESCRIPTION OF THE DRAWINGS

FIG. 4 is a function block diagram illustrating an image encoding unit 11 according to a third embodiment.

FIG. 5 is a function block diagram illustrating an image encoding unit 11 according to a fourth embodiment.

FIG. 6A is a flowchart illustrating encoding processing performed by the image encoding unit 11 according to the first embodiment.

FIG. 9A is a diagram illustrating an example of gain correction performed when a high-gain image is shot at a correct exposure.

FIG. 9B is a diagram illustrating an example of gain correction performed when low-gain image is shot at a correct exposure.

FIG. 10A is a diagram illustrating an example of a compositing ratio for each of images when a high-gain image is shot at a correct exposure.

FIG. 10B is a diagram illustrating an example of a compositing ratio for each of images when a low-gain image is shot at a correct exposure.

DESCRIPTION OF THE EMBODIMENTS

Figure 1:
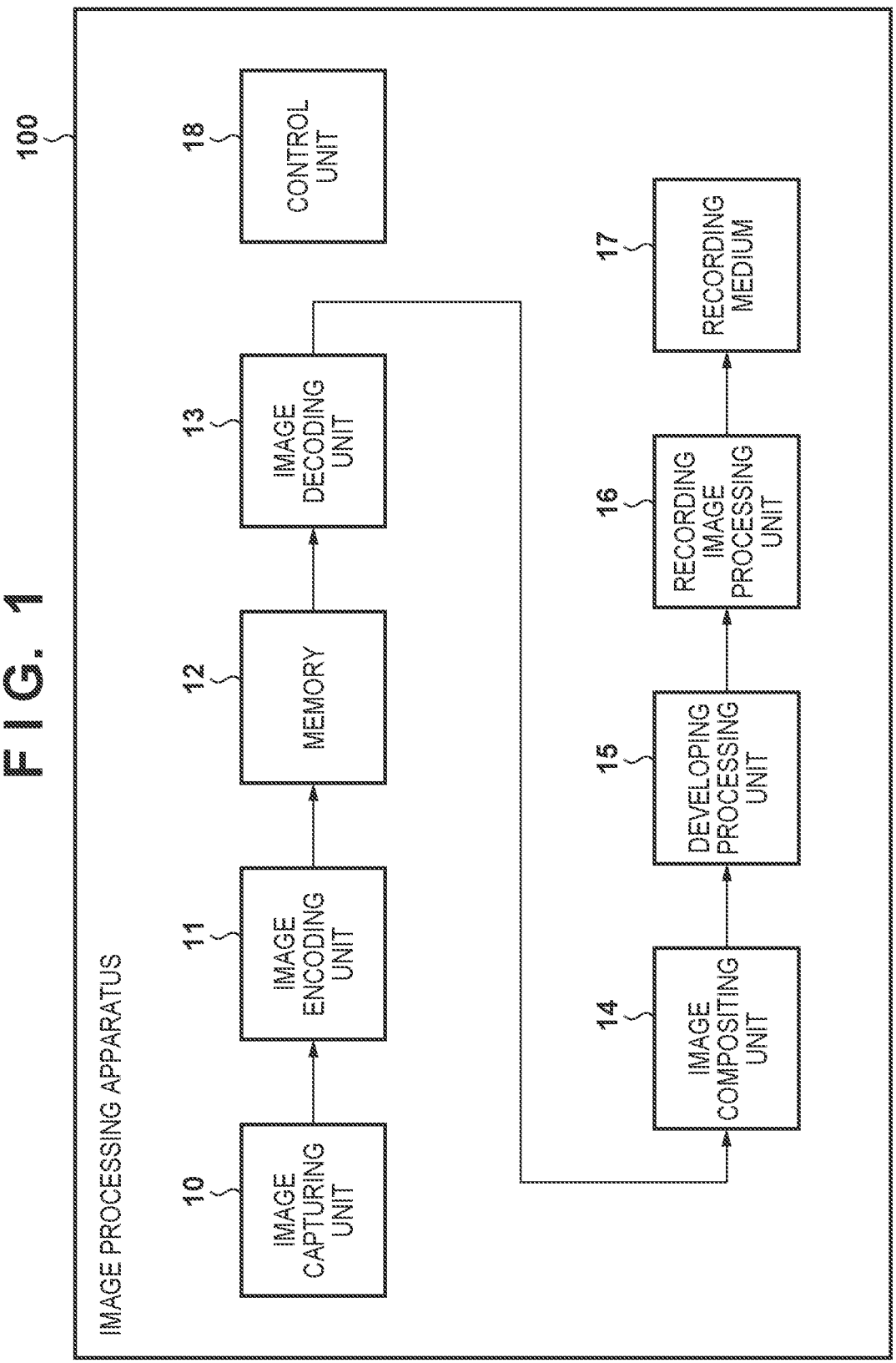
FIG. 1 is a function block diagram illustrating the configuration of an image processing apparatus 100.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

Configuration of Image Processing Apparatus

FIG. 1 is a function block diagram illustrating the configuration of an image processing apparatus 100 according to a first embodiment. The image processing apparatus 100 includes an image capturing unit 10, an image encoding unit 11 (encoding apparatus), memory 12, an image decoding unit 13, an image compositing unit 14, a developing processing unit 15, a recording image processing unit 16, a recording medium 17, and a control unit 18.

The functions of the blocks in the image processing apparatus 100 may be implemented by either hardware or software, aside from some (e.g., the functions of physical devices such as the image capturing unit 10, the memory 12, and the recording medium 17). For example, the functions of the blocks may be implemented by hardware such as dedicated devices, logic circuits, memory, and the like. Alternatively, the functions of the blocks may be implemented by memory, processing programs stored in the memory, and a computer such as a CPU which executes the processing programs.

Although the image processing apparatus 100 can be implemented as, for example, a digital camera, the image processing apparatus 100 can be implemented as a different apparatus instead. For example, the image processing apparatus 100 can be implemented as any information processing apparatus or image capturing apparatus, including personal computers, mobile phones, smartphones, PDAs, tablet terminals, digital video cameras, and the like.

The control unit 18 includes a CPU, ROM, RAM, and the like, and controls the image processing apparatus 100 as a whole according to a control program.

The image capturing unit 10 includes an image sensor, photoelectrically converts an optical image formed on the image sensor through an optical system (not shown), and A/D converts an obtained analog signal to output a digital image signal (i.e., RAW data).

The image capturing unit 10 has two operating modes: an operating mode in which an image signal amplified by a single gain is output for a single pixel (called "normal mode" hereinafter), and an operating mode in which image signals amplified by a plurality of different gains are output for a single pixel (called "HDR mode" hereinafter). When the image capturing unit 10 operates in normal mode, the image capturing unit 10 outputs one type of image signal amplified by a predetermined single gain in a single shot. When the image capturing unit 10 operates in HDR mode, the image capturing unit 10 outputs a plurality of different types of image signals amplified by a plurality of different gains in a single shot. These operating modes can be controlled by the control unit 18 or the like provided within the image processing apparatus 100. A user operating the image processing apparatus 100 can change the operating mode through the control unit 18 provided within the image processing apparatus 100.

The present embodiment assumes that when the image capturing unit 10 operates in HDR mode, two types of image signals, namely an image signal amplified at a low gain (called a "low-gain image signal" hereinafter) and an image signal amplified at a high gain (called a "high-gain image signal" hereinafter), are output from the image capturing unit 10. In this case, the amount of data output from the image capturing unit 10 in a single shot is twice as high as when in the normal mode. The image capturing unit 10 may be configured to be capable of outputting three or more types of image signals, such as a low-gain image signal, a mid-gain image signal, and a high-gain image signal.

Figure 7A:
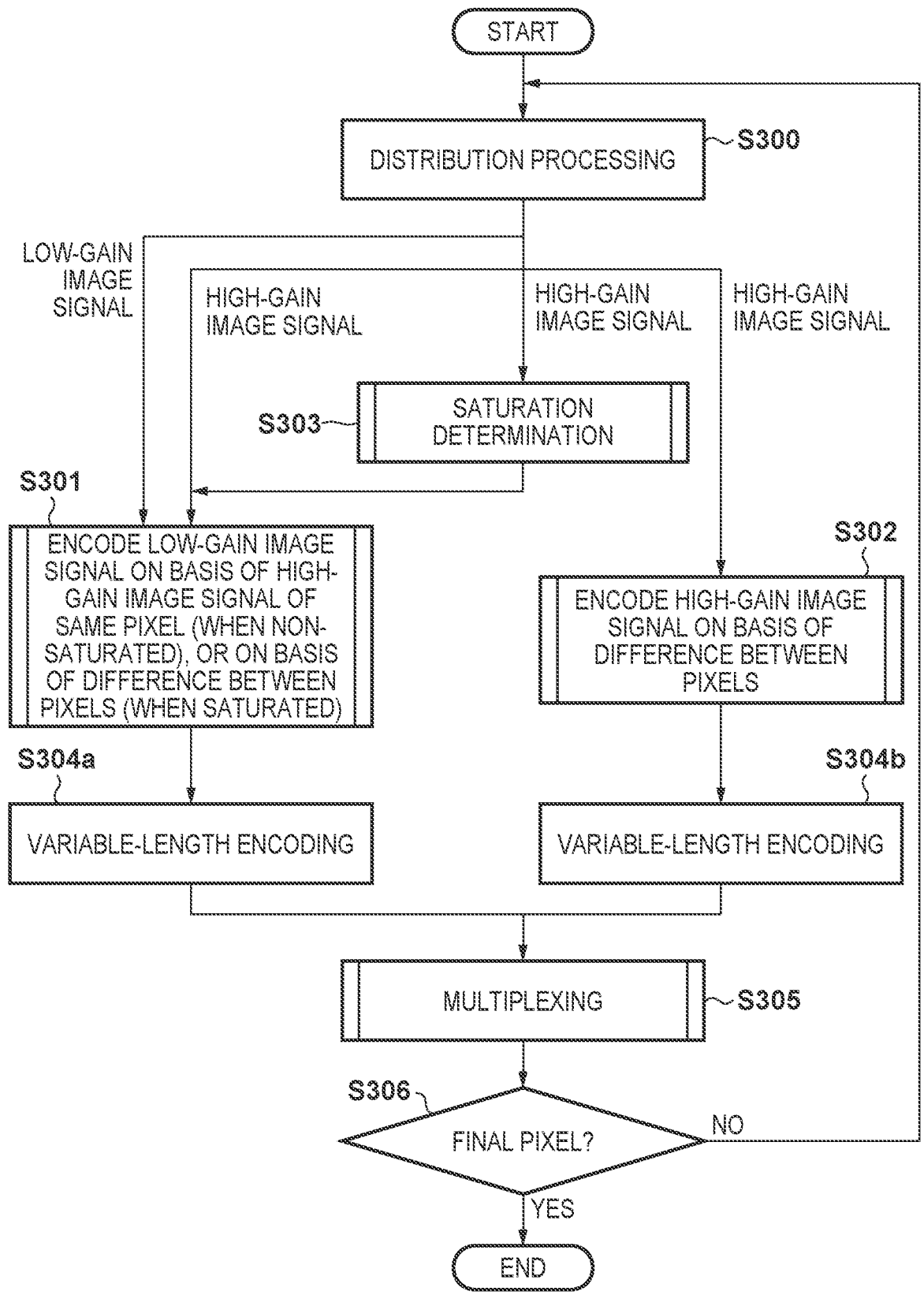
FIG. 7A is a flowchart illustrating encoding processing performed by the image encoding unit 11 according to the second embodiment.

The image capturing unit 10 may include a configuration for outputting a high-gain image signal and a low-gain image signal alternately from row to row when in HDR mode, as indicated in FIG. 7(a) of Japanese Patent Laid-Open No. 2019-186910 (called "configuration A" hereinafter). Likewise, the image capturing unit 10 may include a configuration for simultaneously outputting the high-gain image signal and the low-gain image signal when in HDR mode (called "configuration B" hereinafter).

The image encoding unit 11 encodes the image signal supplied from the image capturing unit 10 according to an encoding method which will be described later, and outputs encoded data having a reduced amount of data. The output encoded data is stored in the memory 12.

The memory 12 stores the encoded data output from the image encoding unit 11. The memory 12 functions as buffer memory, and has a storage capacity necessary for storing the encoded data output from the image encoding unit 11.

The image decoding unit 13 reads out the encoded data held in the memory 12 and outputs a decoded image signal to the image compositing unit 14.

When the image capturing unit 10 operates in HDR mode, the image compositing unit 14 generates a high-dynamic range image (called an "HDR image" hereinafter) by compositing the low-gain image signal and the high-gain image signal output from the image decoding unit 13. When the image capturing unit 10 operates in normal mode, the image compositing unit 14 outputs the image signal output from the image decoding unit 13 as-is to the developing processing unit 15.

The developing processing unit 15 generates recording image data by performing developing processing on the image output by the image compositing unit 14 (the RAW data). To be more specific, the developing processing unit 15 performs color interpolation processing called de-Bayering (demosaicing), color space conversion processing, noise reduction processing, optical distortion correction, enlargement/reduction processing, and the like to generate recording image data expressed as a luminance and color differences, such as YCbCr 4:2:2.

In the present embodiment, the image compositing unit 14 will be described as performing image compositing on the image output from the image decoding unit 13, but other configurations may be used instead. For example, a configuration may be used in which the image compositing unit 14 is provided in a stage after the developing processing unit 15 and performs the image compositing on the developed image output from the developing processing unit 15.

The recording image processing unit 16 performs compression processing on the recording image data output from the developing processing unit 15, and stores the compressed recording image data in the recording medium 17. When, for example, the recording image data is a still image, the recording image processing unit 16 compresses the recording image data using JPEG compression, HEIF compression, or the like. When the recording image data is a moving image, the recording image processing unit 16 compresses the recording image data using MPEG-2, H.264, H.265, or the like.

Note that in FIG. 1, the image capturing unit 10, the image encoding unit 11, the memory 12, the image decoding unit 13, the image compositing unit 14, the developing processing unit 15, the recording image processing unit 16, the recording medium 17, and the control unit 18 are illustrated as independent units. However, all of these blocks may be integrated into a single chip, or divided among a plurality of chips. For example, the image capturing unit 10 and the image encoding unit 11 may be configured integrally as a single sensor device, and the other blocks may be placed in one or more chips. Additionally, the image capturing unit 10 may be configured as a single sensor device, and the other blocks may be placed in one or more chips.

Generation of HDR Image by Image Compositing Unit 14

Figure 8:
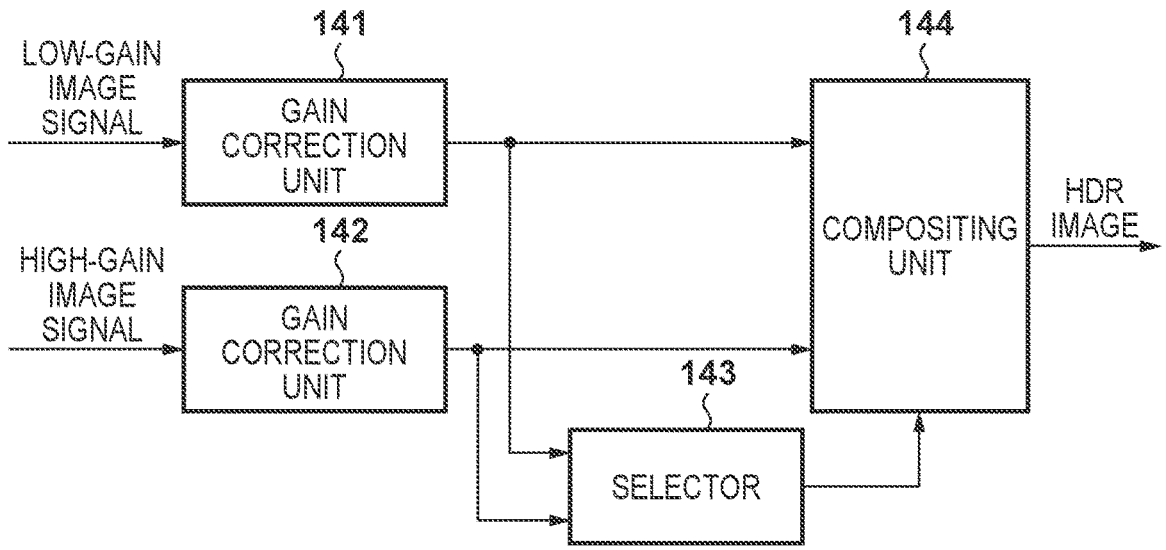
FIG. 8 is a function block diagram illustrating an image compositing unit 14.

The method by which the image compositing unit 14 generates the HDR image will be described here with reference to FIG. 8. FIG. 8 is a function block diagram illustrating the image compositing unit 14. The image compositing unit 14 is constituted by a low-gain image gain correction unit 141, a high-gain image gain correction unit 142, a selector 143, and a compositing unit 144.

When generating an HDR image, one of the two types of images, i.e., the low-gain image and the high-gain image, is typically data shot at a correct exposure, while the other image is used as supplementary data for expanding the dynamic range. The following will describe two cases, namely a case where the high-gain image is shot at the correct exposure, and a case where the low-gain image is shot at the correct exposure.

It is assumed that in the present embodiment, the user operating the image processing apparatus 100 can set which of the low-gain image and the high-gain image has the correct exposure through the control unit 18 provided in the image processing apparatus 100. The control unit 18 may be configured to be capable of automatically determining which image has the correct exposure.

The gain correction unit 141 and the gain correction unit 142 are used to align the exposures of the low-gain image and the high-gain image. The correction performed by the gain correction unit 141 and the gain correction unit 142 will be described here in detail with reference to FIGS. 9A and 9B.

FIG. 9A is a diagram illustrating an example of gain correction performed when the high-gain image is shot at the correct exposure. When the brightness of a subject (an input light amount) exceeds a given threshold th_white, the output of the high-gain image will be blown out, and gradations will be lost. On the other hand, with the low-gain image, no blowout will occur, and the gradations will remain, even at brightnesses exceeding the threshold th_white. The pixel values of parts of the high-gain image where blowout will occur are estimated by increasing the gain for the low-gain image in the gain correction unit 141. Then, an HDR image which compensates for blown-out areas can be generated by the compositing unit 144 in the later stage compositing the low-gain image, for which the gain has been increased, with the high-gain image. Note that when the high-gain image has been shot at the correct exposure, no gain correction need be performed on the high-gain image in the gain correction unit 142.

FIG. 9B is a diagram illustrating an example of gain correction performed when the low-gain image is shot at the correct exposure. When the brightness of the subject (the input light amount) is below a given threshold th_dark, the output of the low-gain image will have blocked-up shadows, and gradations will be lost. On the other hand, with the high-gain image, there will be regions where no blocked-up shadows occur and gradations remain, even at brightnesses below the threshold th_dark. The pixel values of parts of the low-gain image where blocked-up shadows will occur are estimated by reducing the gain for the high-gain image in the gain correction unit 142. Then, an HDR image which compensates for blocked-up shadow parts can be generated by the compositing unit 144 in the later stage compositing the high-gain image, for which the gain has been reduced, with the low-gain image. Note that when the low-gain image has been shot at the correct exposure, no gain correction need be performed on the low-gain image in the gain correction unit 141.

Note that the degree of the gain correction performed by the gain correction unit 141 and the gain correction unit 142 (the gain values) may be obtained from a gain ratio between the low-gain image and the high-gain image, an exposure time ratio between the low-gain image and the high-gain image, or the like. For example, when the high-gain image is shot at the correct exposure and the gain ratio between the low-gain image and the high-gain image is 1:4, if the pixel values of the low-gain image are multiplied by 4, the pixel values of the blown-out part of the high-gain image can be estimated.

The selector 143 outputs, to the compositing unit 144, the pixel values of the image, among the low-gain image and the high-gain image, which has been shot at the correct exposure.

The compositing unit 144 composites the low-gain image and the high-gain image output from the gain correction unit 141 and the gain correction unit 142, and generates an HDR image. Here, an example of the method by which the compositing unit 144 composites the low-gain image and the high-gain image will be described with reference to FIGS. 10A and 10B.

The horizontal axis of each graph in FIGS. 10A and 10B represents the brightness (pixel value) of the correctly-exposed image, which is a pixel value obtained from the selector 143. The vertical axis represents the compositing ratio of each of the low-gain image and the high-gain image.

In the present embodiment, the total of the compositing ratio of each image is set to always be 100% when compositing the images. In other words, a pixel value hdr_img [pix] of the HDR image output from the compositing unit 144 can be derived through the following Formula 1.

$$\text{hdr\_img}[pix] = \alpha \times \text{main\_img}[pix] + (1 - \alpha) \times \text{sub\_img}[pix] \quad (1)$$

Here, α represents the compositing ratio of a correctly-exposed image, main_img [pix] represents the pixel value of the correctly-exposed image, and sub_img [pix] represents the pixel value of an incorrectly-exposed image after gain correction.

FIG. 10A is a diagram illustrating an example of the compositing ratio for each of images when the high-gain image is shot at the correct exposure. As illustrated in FIG. 9A, blown out highlights occur in the high-gain image at brightnesses exceeding the threshold th_white. Accordingly, in the present embodiment, the compositing ratio of the high-gain image is shifted so as to decrease from a threshold th_pre_white to 0% upon reaching the threshold th_white. Additionally, the compositing ratio of the low-gain image after gain correction is shifted so as to increase from the threshold th_pre_white to 100% upon reaching the threshold th_white. By setting the compositing ratio in this manner, a high dynamic range image which compensates for blown-out parts can be generated.

FIG. 10B is a diagram illustrating an example of the compositing ratio for each of images when the low-gain image is shot at the correct exposure. As illustrated in FIG. 9B, blocked-up shadows occur in the low-gain image at brightnesses below the threshold th_dark. Accordingly, in the present embodiment, the compositing ratio of the low-gain image is shifted so as to decrease from a threshold th_pre_dark to 0% upon reaching the threshold th_dark. Additionally, the compositing ratio of the high-gain image after gain correction is shifted so as to increase from the threshold th_pre_dark to 100% upon reaching the threshold th_dark. By setting the compositing ratio in this manner, a high dynamic range image which compensates for blocked-up shadow parts can be generated.

Although the present embodiment describes an example of changing the compositing ratio from a given threshold for the sake of simplicity, the algorithm for the compositing processing is not limited thereto.

Configuration and Operations of Image Encoding Unit 11

Figure 2:
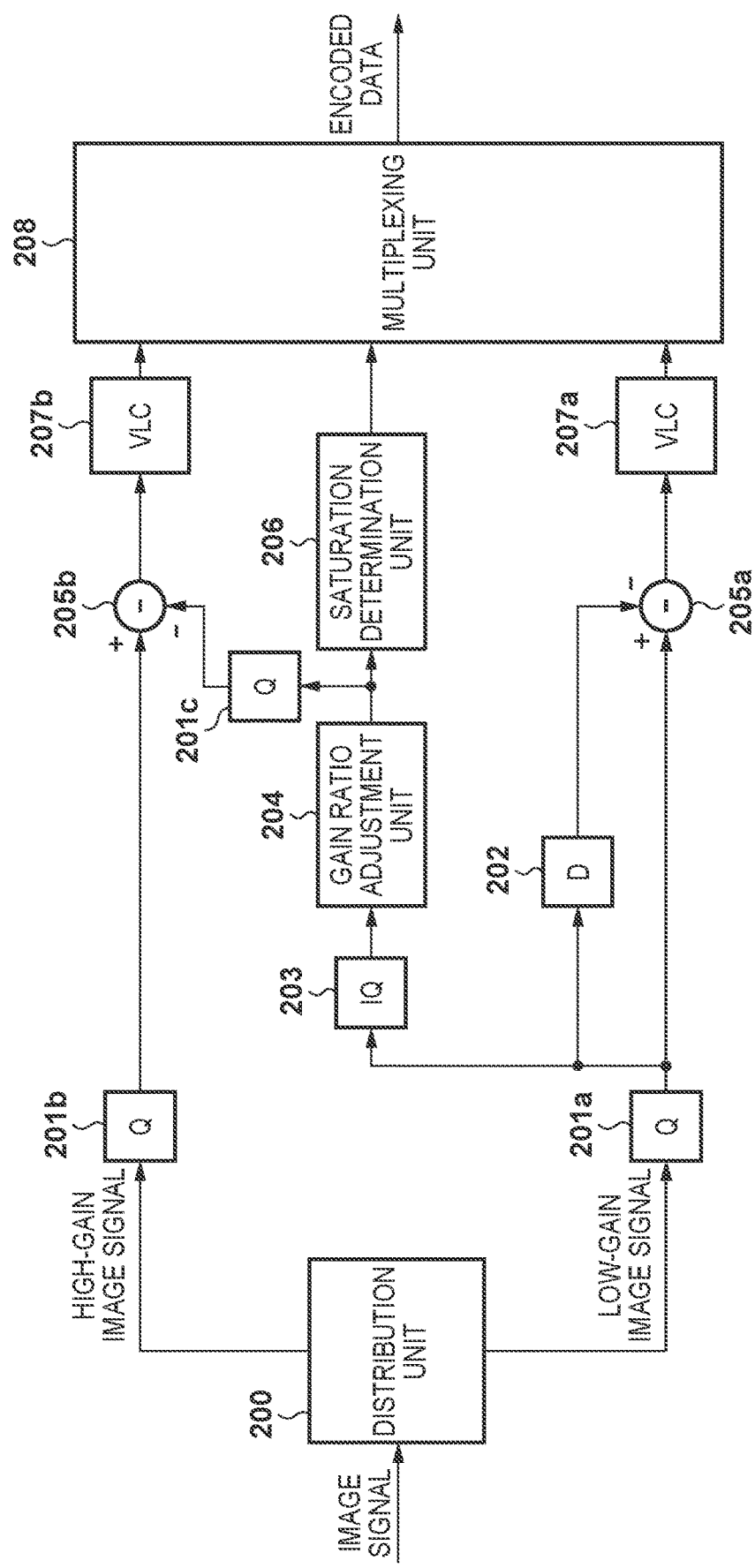
FIG. 2 is a function block diagram illustrating an image encoding unit 11 according to a first embodiment.

The configuration and operations of the image encoding unit 11 according to the first embodiment will be described next with reference to FIG. 2. FIG. 2 is a function block diagram illustrating the image encoding unit 11 according to the first embodiment. The image encoding unit 11 encodes the high-gain image signal of each pixel on the basis of a correlation with the low-gain image signal from the same pixel, and encodes the low-gain image signal of each pixel on the basis of a correlation with the low-gain image signal corresponding to another pixel.

A distribution unit 200 takes the image signal output from the image capturing unit 10, separates the image signal into a high-gain image signal and a low-gain image signal, and outputs each separately. When the image capturing unit 10 is in configuration A, the distribution unit 200 may be configured to take the previously output gain image signal one line at a time, delay the signal internally, and output the signal separately, one line at a time, at the same time as the other gain image signal that is output next. Meanwhile, when the image capturing unit 10 is in configuration B, the distribution unit 200 may be configured to simply separate the high-gain image signal and the low-gain image signal output simultaneously and output each signal separately.

A quantization unit 201a quantizes the low-gain image signal output by the distribution unit 200 and outputs the result as a quantized low-gain image signal to a subtraction unit 205a, a delay unit 202, and an inverse quantization unit 203. The quantization unit 201a may be configured to perform quantization on the basis of a predetermined fixed quantization step value, or on the basis of a quantization step value set by the control unit 18 or the like.

A quantization unit 201b quantizes the high-gain image signal output by the distribution unit 200 and outputs the result as a quantized high-gain image signal to a subtraction unit 205b. Like the quantization unit 201a, the quantization unit 201b may be configured to perform quantization on the basis of a predetermined fixed quantization step value, or on the basis of a quantization step value set by the control unit 18 or the like.

The delay unit 202 delays the quantized low-gain image signal output by the quantization unit 201a by a predetermined number of pixels, and outputs the result to the subtraction unit 205a as a predictive value of the low-gain image signal.

The subtraction unit 205a subtracts the predictive value of the low-gain image signal output by the delay unit 202 from the quantized low-gain image signal output by the quantization unit 201a, and outputs the result of the subtraction to a variable-length encoding unit 207a as a differential quantized low-gain image signal.

The inverse quantization unit 203 inverse-quantizes the quantized low-gain image signal output by the quantization unit 201a and outputs the result as a locally-decoded low-gain image signal to a gain ratio adjustment unit 204. The inverse quantization unit 203 performs inverse quantization using the same quantization step value used for the quantization by the quantization unit 201a to obtain the locally-decoded low-gain image signal.

The gain ratio adjustment unit 204 performs gain ratio adjustment on the locally-decoded low-gain image signal output by the inverse quantization unit 203, and outputs the result as a gain ratio-adjusted low-gain image signal to a quantization unit 201c and a saturation determination unit 206.

The quantization unit 201c quantizes the gain ratio-adjusted low-gain image signal output by the gain ratio adjustment unit 204 and outputs the result to the subtraction unit 205b as a quantized gain ratio-adjusted low-gain image signal. The quantization unit 201c may have the same configuration as the quantization unit 201b. The quantization unit 201c also performs quantization using the same quantization step value used for quantization by the quantization unit 201b.

The subtraction unit 205b subtracts the quantized gain ratio-adjusted low-gain image signal output by the quantization unit 201c from the quantized high-gain image signal output by the quantization unit 201b, and outputs the result of the subtraction to a variable-length encoding unit 207b as a differential quantized high-gain image signal.

The saturation determination unit 206 makes a saturation determination using the gain ratio-adjusted low-gain image signal output by the gain ratio adjustment unit 204 as an input, and outputs determination result information to a multiplexing unit 208.

The variable-length encoding unit 207a performs encoding using a predetermined variable-length encoding method on the differential quantized low-gain image signal output by the subtraction unit 205a, generates variable-length code data and a variable-length code data code length for each pixel, and outputs these items to the multiplexing unit 208.

The variable-length encoding unit 207b performs encoding using a predetermined variable-length encoding method on the differential quantized high-gain image signal output by the subtraction unit 205b, generates variable-length code data and a variable-length code data code length for each pixel, and outputs these items to the multiplexing unit 208.

The multiplexing unit 208 generates encoded data on the basis of the variable-length code data and the variable-length code data code length output by the variable-length encoding unit 207a and the variable-length encoding unit 207b, and the determination result information output by the saturation determination unit 206, and outputs the encoded data for each predetermined unit length.

The encoding processing performed by the image encoding unit 11 will be described in detail next with reference to the flowchart in FIG. 6A. The processing of this flowchart starts when the image capturing unit 10 outputs an image signal to the image encoding unit 11.

In step S200, the distribution unit 200 obtains the image signal generated and output by the image capturing unit 10, separates the obtained image signal into a high-gain image signal and a low-gain image signal, and outputs each separately. At this time, the distribution unit 200 operates such that the high-gain image signal and the low-gain image signal corresponding to the same pixel are output in parallel at the same timing. A relatively small gain (a first gain) is applied to the low-gain image signal (a first pixel value), and a relatively large gain (a second gain) is applied to the high-gain image signal (a second pixel value).

The flow of processing following step S200 splits into three branches with steps S201, S202, and S203.

The branch for step S201 will be described first. In step S201, the image encoding unit 11 performs differential encoding of the image signal (pixel values) at the pixel level, for the low-gain image signal obtained from the separation in step S200. In differential encoding, the image encoding unit 11 uses an already-encoded image signal (pixel value) at the same gain (i.e., low gain) of a pixel different from the pixel of the image signal (pixel value) to be encoded as a predictive value. The processing in step S201 will be described in detail later with reference to FIG. 6B.

In step S204a, the variable-length encoding unit 207a performs variable-length encoding using, as an input, the result of the differential encoding on the low-gain image signal, which is the result of the processing of step S201. In this step, the variable-length encoding unit 207a assigns variable-length code to the differential encoding result of the low-gain image signal, which is the input, and outputs the variable-length code. Huffman coding, Golomb coding, or the like can be used as the variable-length encoding method applied in this step, for example. In the present embodiment, code data of the shortest code length is assigned when the input value is 0, and code data of longer code lengths is assigned as the absolute value of the input value increases. The processing result of this step is used in the processing of step S205, which will be described later.

The branch for step S202 will be described next. In step S202, the image encoding unit 11 performs differential encoding of the image signal (pixel values) at the pixel level, for the high-gain image signal obtained from the separation in step S200. In the differential encoding, the image encoding unit 11 uses, as the predictive value, a value obtained by performing gain ratio adjustment on the low-gain image signal (pixel value) in the same pixel as the pixel for the image signal (pixel value) to be encoded. The processing in step S202 will be described in detail later with reference to FIG. 6C.

In step S204b, the variable-length encoding unit 207b performs variable-length encoding using, as an input, the result of the differential encoding on the high-gain image signal, which is the result of the processing of step S202. In this step, the variable-length encoding unit 207b assigns variable-length code to the differential encoding result of the high-gain image signal, which is the input, and outputs the variable-length code. The details of this step are the same as those of step S204a. The processing result of this step is used in the processing of step S205, which will be described later.

The branch for step S203 will be described last. In step S203, the image encoding unit 11 determines whether or not the high-gain image signal (pixel value) is saturated in the same pixel for the low-gain image signal obtained from the separation in step S200. The processing result of this step is used in the processing of step S205, which will be described later. The processing in step S203 will be described in detail later with reference to FIG. 6D.

Following the processing of the above three branches, in step S205, the multiplexing unit 208 performs multiplexing processing using the variable-length encoding result of the low-gain image signal obtained in step S204a, the variable-length encoding result of the high-gain image signal obtained in step S204b, and the saturation determination result obtained in step S203 as inputs. The processing in step S205 will be described in detail later with reference to FIG. 6E.

In step S206, the image encoding unit 11 performs a final pixel determination. In this step, the image encoding unit 11 determines whether or not the pixel processing in steps S200 to S205 is the final pixel in the image to be processed. If the pixel is the final pixel, the processing of this flowchart ends. If not, the image encoding unit 11 returns the processing step to step S200 and performs the same processing for the next pixel.

Figure 6B:
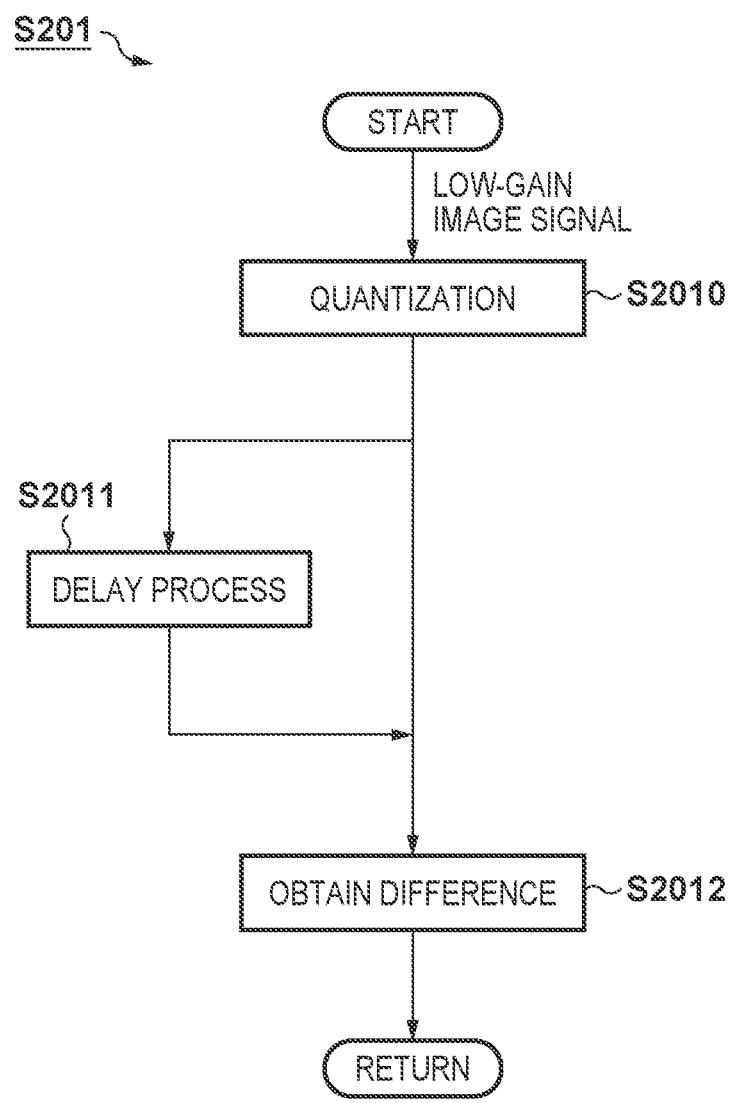
FIG. 6B is a flowchart illustrating details of processing performed in step S201 of FIG. 6A.

The processing of step S201 in FIG. 6A will be described in detail next with reference to FIG. 6B. In step S2010, the quantization unit 201a quantizes the low-gain image signal output from the distribution unit 200 using a predetermined quantization step value and outputs a quantization result (the quantized low-gain image signal).

In step S2011, the delay unit 202 delays the quantized low-gain image signal output by the quantization unit 201a by a predetermined number of pixels, and outputs the result to the subtraction unit 205a as a predictive value of the low-gain image signal. The delay unit 202 is configured to delay by a predetermined number of pixels in order to generate, as the predictive value, a surrounding pixel value of the same gain (i.e., low gain) that has already been encoded. For example, if the pixel value of the immediately-previous pixel adjacent to the pixel to be encoded is used as the predictive value, the delay unit 202 delays by one pixel.

In step S2012, the subtraction unit 205a subtracts the predictive value of the low-gain image signal obtained in step S2011 from the quantized low-gain image signal obtained in step S2010, and outputs the result of the subtraction as the differential quantized low-gain image signal. This completes the differential encoding of step S201.

The processing of step S202 in FIG. 6A will be described in detail next with reference to FIG. 6C. The processing of step S202 splits into a branch for the high-gain image signal and a branch for the low-gain image signal at the starting point.

The branch for the high-gain image signal will be described first. In step S2020, the quantization unit 201b quantizes the high-gain image signal output from the distribution unit 200 using a predetermined quantization step value, and outputs the quantization result (the quantized high-gain image signal). The processing result of this step is used in step S2024, which will be described later.

The branch for the low-gain image signal will be described next. The processing of step S2010 in FIG. 6C is the same as the processing of step S2010 in FIG. 6B. Although step S2010 is shown in FIG. 6C too for explanatory purposes, the processing of this step is the same as the processing of step S2010 in FIG. 6B. The processing of step S2010 shown in FIG. 6D and described later is also the same as the processing of step S2010 in FIG. 6B. Accordingly, the quantization unit 201a does not need to perform the processing of these three steps S2010 separately, and may perform a single instance of quantization processing as processing common to the three steps S2010.

In step S2021, the inverse quantization unit 203 generates a locally-decoded low-gain image signal value by inverse-quantizing the quantized low-gain image signal obtained in step S2010 using the quantization step value used in step S2010. Doing so makes it possible to recover the same value on the decoding side.

In step S2022, the gain ratio adjustment unit 204 generates the gain ratio-adjusted low-gain image signal by performing gain ratio adjustment on the locally-decoded low-gain image signal output by the inverse quantization unit 203. In the gain ratio adjustment processing, the gain ratio adjustment unit 204 finds a gain ratio R in accordance with whether the high-gain image signal and the low-gain image signal output by the image capturing unit 10 have been amplified by any rate (gain). Next, the gain ratio adjustment unit 204 obtains the gain ratio-adjusted low-gain image signal by multiplying the locally-decoded low-gain image signal that is input by the gain ratio R. For example, if the high-gain image signal has been amplified at 8× and the low-gain image signal has been amplified at 2×, the gain ratio R can be calculated through the following Formula (2).

$$R = 8/2 = 4 \qquad (2)$$

In step S2023, the quantization unit 201c quantizes the gain ratio-adjusted low-gain image signal using the quantization step value used in step S2020. The quantization unit 201c outputs this quantization result as the predictive value of the corresponding high-gain image signal. The processing result of this step is used in step S2024, which will be described later.

Following the processing of the above-described two branches, in step S2024, the subtraction unit 205b subtracts the gain ratio-adjusted low-gain image signal obtained in step S2023 (i.e., the predictive value of the high-gain image signal) from the quantization result obtained in step S2020 (the quantized high-gain image signal). The subtraction unit 205b outputs the result of the subtraction as the differential quantized high-gain image signal. This completes the differential encoding of step S202.

The processing of step S203 in FIG. 6A will be described in detail next with reference to FIG. 6D. The processing of step S2010 in FIG. 6D is the same as the processing of step S2010 in FIG. 6B. Note that as described with reference to step S2010 in FIG. 6C, the quantization unit 201a does not need to perform the processing of the three steps S2010 shown in FIGS. 6B to 6D separately, and may perform a single instance of quantization processing as processing common to the three steps S2010.

Figure 6C:
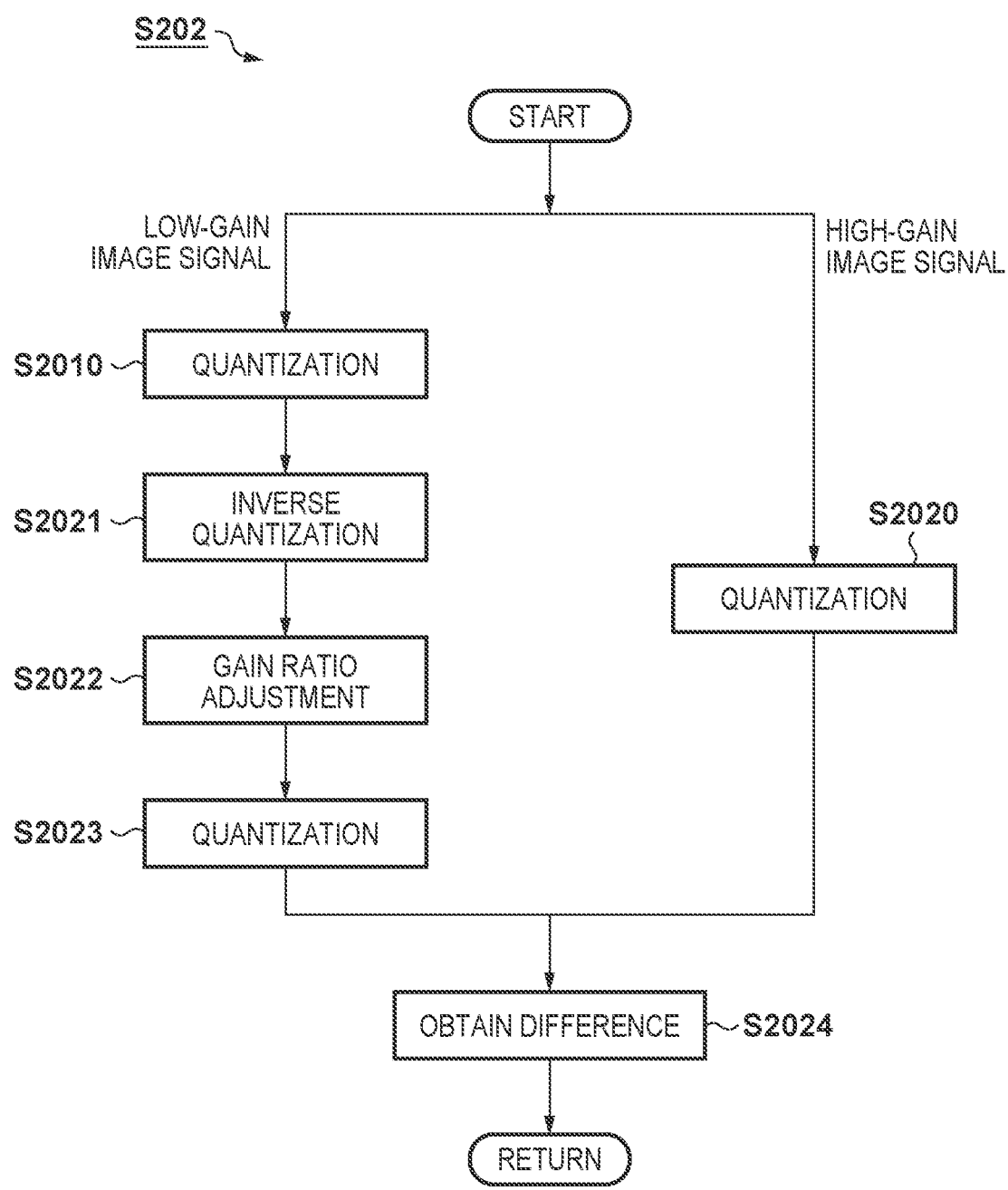
FIG. 6C is a flowchart illustrating details of processing performed in step S202 of FIG. 6A.
Figure 6D:
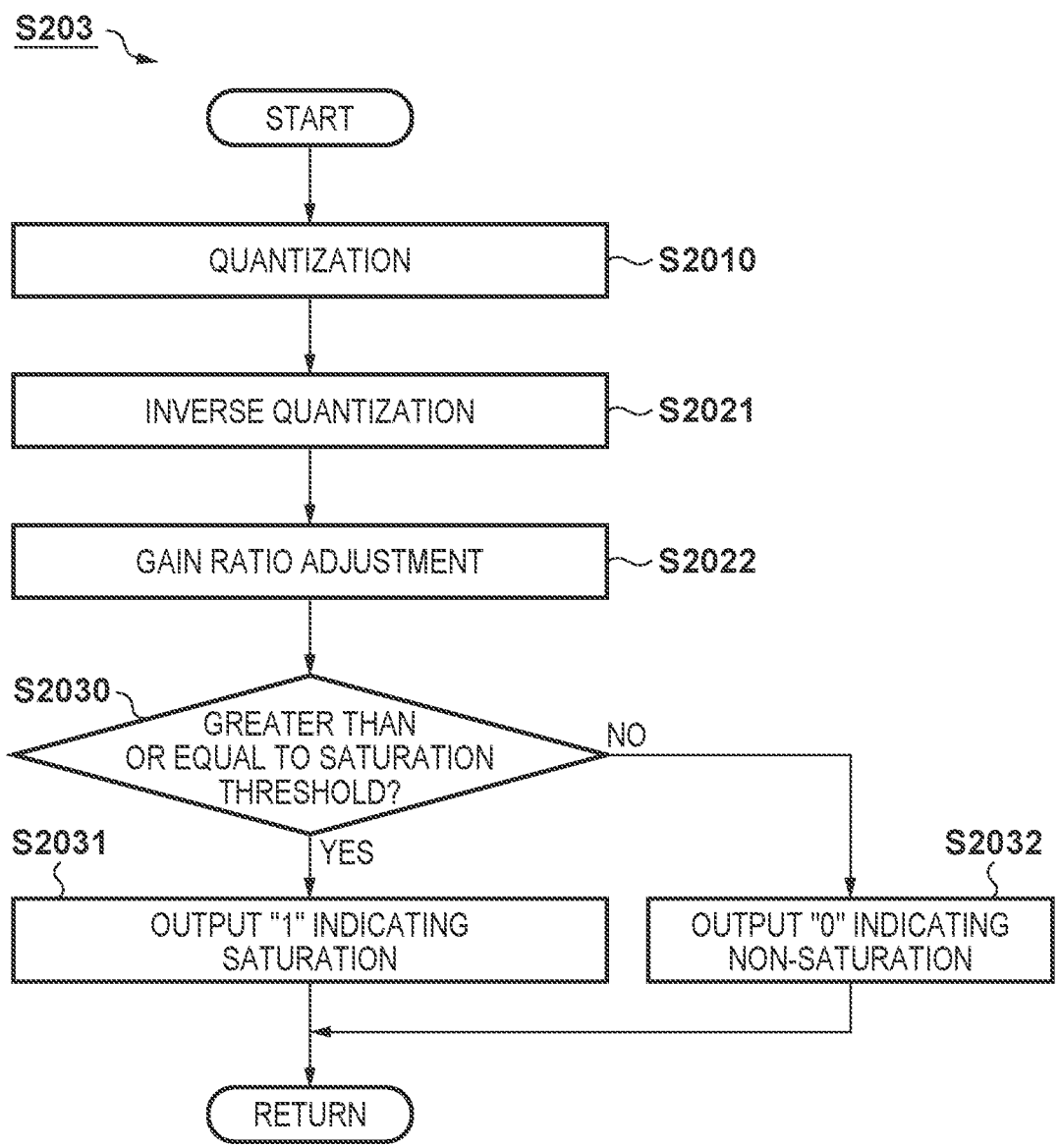
FIG. 6D is a flowchart illustrating details of processing performed in step S203 of FIG. 6A.

The processing of steps S2021 and S2022 in FIG. 6D is the same as the processing of steps S2021 and S2022 in FIG. 6C. Although steps S2021 and S2022 are shown in FIG. 6D too for explanatory purposes, the processing of these steps is the same as the processing of steps S2021 and S2022 in FIG. 6C. Accordingly, the inverse quantization unit 203 does not need to perform the processing of these two steps S2021 separately, and may perform a single instance of inverse quantization processing as processing common to the two steps S2021. Likewise, the gain ratio adjustment unit 204 does not need to perform the processing of the two steps S2022 separately, and may perform a single instance of gain ratio adjustment processing as processing common to the two steps S2022.

In step S2030, the saturation determination unit 206 determines whether or not the corresponding high-gain image signal is saturated on the basis of the gain ratio-adjusted low-gain image signal obtained in step S2022. In the present embodiment, the high-gain image signal is encoded on the basis of the saturation determination result, and thus the saturation determination cannot be performed using the high-gain image signal on the decoding side. As such, the saturation determination unit 206 performs the saturation determination on the basis of the gain ratio-adjusted low-gain image signal, without using the high-gain image signal. The saturation determination unit 206 determines that the corresponding high-gain image signal is saturated if the gain ratio-adjusted low-gain image signal is greater than or equal to a saturation threshold, and determines that the corresponding high-gain image signal is not saturated if the gain ratio-adjusted low-gain image signal is less than the saturation threshold. The processing moves to step S2031 if the high-gain image signal is saturated, and to step S2032 if not.

In step S2031, the saturation determination unit 206 outputs "1", which is a value indicating that the high-gain image signal is saturated, to the multiplexing unit 208. In step S2032, the saturation determination unit 206 outputs "0", which is a value indicating that the high-gain image signal is not saturated, to the multiplexing unit 208. This completes the saturation determination of step S203.

Figure 6E:
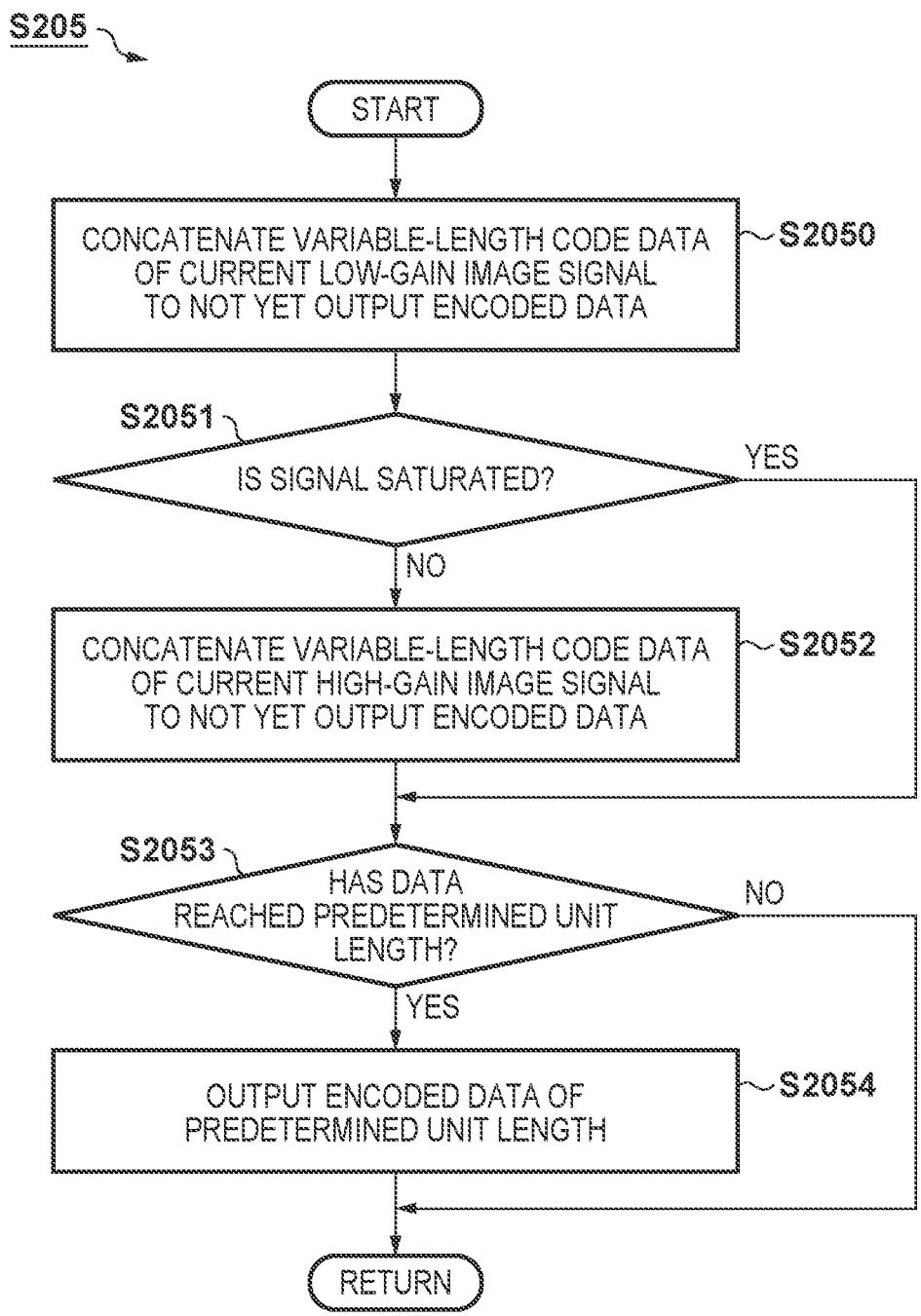
FIG. 6E is a flowchart illustrating details of processing performed in step S205 of FIG. 6A.

The processing of step S205 in FIG. 6A will be described in detail next with reference to FIG. 6E. In step S2050, the multiplexing unit 208 concatenates the variable-length code data of the current low-gain image signal obtained in step S204a to the end of the not yet output encoded data accumulated in the multiplexing unit 208 without gaps.

In step S2051, the multiplexing unit 208 determines whether or not the current high-gain image signal is saturated on the basis of the value output by the saturation determination unit 206. If the high-gain image signal is not saturated (if "0" is output), the processing moves to step S2052, whereas if the high-gain image signal is saturated (if "1" is output), the processing moves to step S2053.

In step S2052, the multiplexing unit 208 concatenates the variable-length code data of the current high-gain image signal obtained in step S204b to the end of the not yet output encoded data accumulated in the multiplexing unit 208 without gaps. Step S2052 is skipped if the high-gain image signal is saturated, and thus the variable-length code data of the high-gain image signal does not contain the encoded data.

In step S2053, the multiplexing unit 208 determines whether or not the not yet output encoded data accumulated in the multiplexing unit 208 has reached a predetermined unit length. The predetermined unit length is equal to, for example, the bit width of the encoded data output terminal of the image encoding unit 11. If the encoded data has reached the predetermined unit length, the processing moves to step S2054, and if not, the processing of this flowchart ends and the multiplexing of step S205 is complete.

In step S2054, the multiplexing unit 208 outputs the encoded data of the predetermined unit length at the beginning of the not yet output encoded data accumulated in the multiplexing unit 208. The multiplexing of step S205 is completed as a result.

In this manner, in step S205, the multiplexing unit 208 takes variable-length code data and concatenates that data in order with previously obtained data, and outputs the result as encoded data each time the data reaches the predetermined unit length. Additionally, when the saturation determination result indicates that the high-gain image signal is saturated, the multiplexing unit 208 does not use, and instead discards, the variable-length code data of the high-gain image signal.

As described thus far, according to the first embodiment, the image encoding unit 11 obtains a plurality of low-gain image signals (a plurality of first pixel values) and a plurality of high-gain image signals (a plurality of second pixel values) generated by the image capturing unit 10 and corresponding to a plurality of pixels. A relatively small gain (a first gain) is applied to each of the plurality of first pixel values, and a relatively large gain (a second gain) is applied to each of the plurality of second pixel values. Accordingly, there is correlation between the first pixel value and the second pixel value corresponding to the same pixel. The image encoding unit 11 encodes each of the plurality of second pixel values (a plurality of target pixel values) on the basis of the correlation with the first pixel value (a reference pixel value) corresponding to the same pixel among the plurality of first pixel values (a plurality of reference pixel values). As the encoding based on the correlation, the image encoding unit 11 performs differential encoding which uses, as a predictive value, a value obtained by performing gain ratio adjustment on the reference pixel value corresponding to the target pixel value. This makes it possible to encode efficiently and reduce the amount of data.

Additionally, the image encoding unit 11 encodes each of the plurality of first pixel values (the plurality of reference pixel values) on the basis of the correlation with the first pixel value (the reference pixel value) corresponding to another pixel. As the encoding based on the correlation, the image encoding unit 11 performs differential encoding which uses, as a predictive value, the reference pixel value of a pixel different from the reference pixel value to be encoded. Through this, the first pixel value (the low-gain image signal) can be decoded without using the second pixel value (the high-gain image signal) on the decoding side. As such, the decoded first pixel value (low-gain image signal) can be used when generating the predictive value of the second pixel value (the high-gain image signal) on the decoding side.

Additionally, in the image encoding unit 11, when generating the predictive value of the high-gain image signal, using a value obtained by locally decoding the corresponding quantized low-gain image signal makes it possible to use the same predictive value on the decoding side as well.

Additionally, the image encoding unit 11 determines whether or not each of the plurality of high-gain image signals is saturated, and performs control such that corresponding code is not included in the encoded data for a saturated high-gain image signal. This makes it possible to prevent redundant code from being produced, and makes it possible to encode more efficiently. Additionally, the image encoding unit 11 determines the saturation using a value obtained by locally decoding the corresponding quantized low-gain image signal (a locally-decoded value). Through this, the same determination result can be calculated on the decoding side, and there is thus no need to include the determination result in the encoded data, making it possible to encode more efficiently. In this manner, the amount of data is reduced by encoding efficiently, which makes it possible to reduce traffic from the image encoding unit 11 to the memory 12. For example, if the image capturing unit 10 and the image encoding unit 11 in the image processing apparatus 100 are integrated and configured as a single sensor device, and the other blocks are configured within an image processing chip, traffic between the sensor device and the image processing chip can be reduced. Additionally, if the image capturing unit 10 is configured as a single sensor device and the other blocks are configured within an image processing chip, the traffic around the memory in the image processing chip can be reduced.

Although the present embodiment describes a configuration in which the image encoding unit 11 performs quantization and inverse quantization processing, a configuration in which quantization and inverse quantization processing are not performed may be employed as well. In this case, the quantization unit 201a, the quantization unit 201b, the quantization unit 201c, and the inverse quantization unit 203 in FIG. 2 are not needed.

Second Embodiment

The first embodiment described a configuration in which the high-gain image signal (the second pixel value) is encoded on the basis of the correlation with the low-gain image signal (the first pixel value) in the same pixel. However, the low-gain image signal (the first pixel value) can also be encoded on the basis of the correlation with the high-gain image signal (the second pixel value) in the same pixel, which is the opposite from the configuration of the first embodiment. The second embodiment will describe such a configuration, i.e., the opposite from the configuration of the first embodiment.

Note that in the second embodiment, the basic configuration of the image processing apparatus 100 is the same as in the first embodiment (see FIG. 1). The following will primarily describe areas that are different from the first embodiment.

Figure 3:
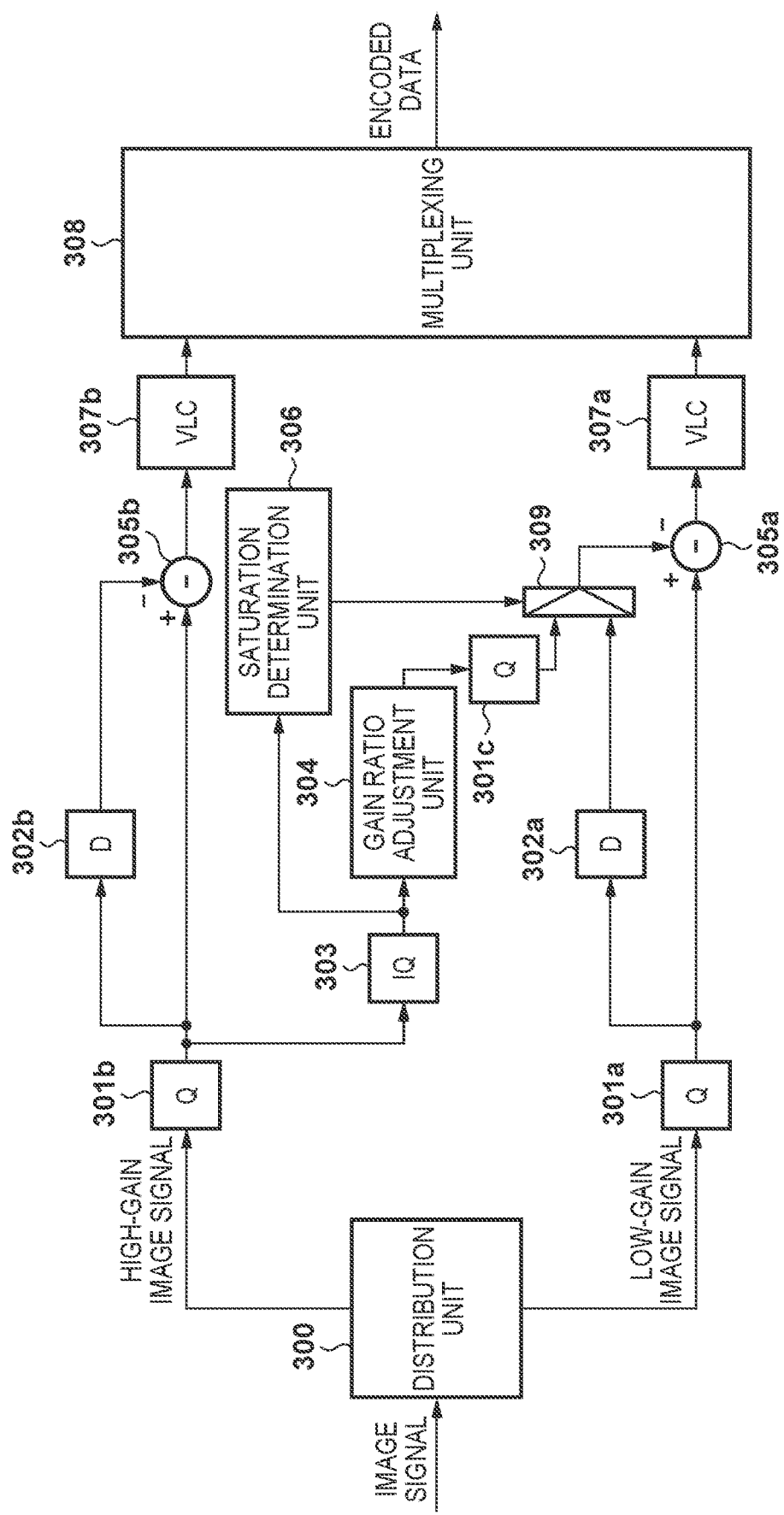
FIG. 3 is a function block diagram illustrating an image encoding unit 11 according to a second embodiment.

FIG. 3 is a function block diagram illustrating the image encoding unit 11 according to the second embodiment. The image encoding unit 11 encodes the low-gain image signal of each pixel on the basis of a correlation with the high-gain image signal in the same pixel, and encodes the high-gain image signal of each pixel on the basis of a correlation with the high-gain image signal corresponding to another pixel. Note that of the blocks included in the image encoding unit 11 in FIG. 3, blocks having the same configuration as in the image encoding unit 11 in FIG. 2 (the first embodiment) will not be described.

A distribution unit 300 takes the image signal output from the image capturing unit 10, separates the image signal into a high-gain image signal and a low-gain image signal, and outputs the signals to a quantization unit 301a and a quantization unit 301b, respectively. The details of the distribution unit 300 are the same as the distribution unit 200 and will therefore not be described.

The quantization unit 301a quantizes the low-gain image signal output by the distribution unit 300, and outputs the result as a quantized low-gain image signal to a delay unit 302a and a subtraction unit 305a. The details of the quantization unit 301a are the same as the quantization unit 201a, and will therefore not be described.

The quantization unit 301b quantizes the high-gain image signal output by the distribution unit 300, and outputs the result as a quantized high-gain image signal to a delay unit 302b, an inverse quantization unit 303, and a subtraction unit 305b. The details of the quantization unit 301b are the same as the quantization unit 201b, and will therefore not be described.

The delay unit 302a delays the quantized low-gain image signal output by the quantization unit 301a by a predetermined number of pixels, and outputs the result to a selector 309 as a delayed low-gain image signal. The details of the delay unit 302a are the same as the delay unit 202 and will therefore not be described.

The delay unit 302b delays the quantized high-gain image signal output by the quantization unit 301b by a predetermined number of pixels, and outputs the result to the subtraction unit 305b as a predictive value of the high-gain image signal. The details of the delay unit 302b are the same as the delay unit 202 and will therefore not be described.

The inverse quantization unit 303 inverse-quantizes the quantized high-gain image signal output by the quantization unit 301b and outputs the result as a locally-decoded high-gain image signal to a gain ratio adjustment unit 304 and a saturation determination unit 306. The inverse quantization unit 303 performs inverse quantization using the same quantization step value used for the quantization by the quantization unit 301b to obtain the locally-decoded high-gain image signal.

The gain ratio adjustment unit 304 performs gain ratio adjustment on the locally-decoded high-gain image signal output by the inverse quantization unit 303, and outputs the result as a gain ratio-adjusted high-gain image signal to a quantization unit 301c. The details of the gain ratio adjustment unit 304 are the same as the gain ratio adjustment unit 204 and will therefore not be described.

The quantization unit 301c quantizes the gain ratio-adjusted high-gain image signal output by the gain ratio adjustment unit 304 and outputs the result as a quantized gain ratio-adjusted high-gain image signal to the selector 309. The quantization unit 301c also performs quantization using the same quantization step value used for quantization by the quantization unit 301a. The details of the quantization unit 301c are the same as the quantization unit 201c, and will therefore not be described.

The saturation determination unit 306 performs a saturation determination using the locally-decoded high-gain image signal output by the inverse quantization unit 303 as an input, and outputs determination result information to the selector 309.

The selector 309 selects one of the quantized gain ratio-adjusted high-gain image signal output by the quantization unit 301c and the delayed low-gain image signal output by the delay unit 302a on the basis of the determination result information output by the saturation determination unit 306, and outputs the selected signal to the subtraction unit 305a as a predictive value of the low-gain image signal.

The subtraction unit 305a subtracts the predictive value of the low-gain image signal output by the selector 309 from the quantized low-gain image signal output by the quantization unit 301a, and outputs the result of the subtraction as a differential quantized low-gain image signal to a variable-length encoding unit 307a. The details of the subtraction unit 305a are the same as the subtraction unit 205a, and will therefore not be described.

The subtraction unit 305b subtracts the predictive value of the high-gain image signal output by the delay unit 302b from the quantized high-gain image signal output by the quantization unit 301b, and outputs the result as a differential quantized high-gain image signal to a variable-length encoding unit 307b. The details of the subtraction unit 305b are the same as the subtraction unit 205b, and will therefore not be described.

The variable-length encoding unit 307a performs encoding using a predetermined variable-length encoding method on the differential quantized low-gain image signal output by the subtraction unit 305a, generates variable-length code data and a variable-length code data code length for each pixel, and outputs these items to a multiplexing unit 308. The details of the variable-length encoding unit 307a are the same as the variable-length encoding unit 207a, and will therefore not be described.

The variable-length encoding unit 307b performs encoding using a predetermined variable-length encoding method on the differential quantized high-gain image signal output by the subtraction unit 305b, generates variable-length code data and a variable-length code data code length for each pixel, and outputs these items to the multiplexing unit 308. The details of the variable-length encoding unit 307b are the same as the variable-length encoding unit 207b, and will therefore not be described.

The multiplexing unit 308 generates encoded data on the basis of the variable-length code data and the variable-length code data code length output by the variable-length encoding unit 307a and the variable-length encoding unit 307b, and outputs the encoded data for each predetermined unit length.

The encoding processing performed by the image encoding unit 11 will be described in detail next with reference to the flowchart in FIG. 7A. The processing of this flowchart starts when the image capturing unit 10 outputs an image signal to the image encoding unit 11.

In step S300, the distribution unit 300 obtains the image signal generated and output by the image capturing unit 10, separates the obtained image signal into a high-gain image signal and a low-gain image signal, and outputs each separately. The details of step S300 are the same as step S200, and will therefore not be described.

The flow of processing following step S300 splits into three branches with steps S301, S302, and S303.

The branch for step S301 will be described first. In step S301, the image encoding unit 11 performs differential encoding of the image signal (pixel values) at the pixel level, for the low-gain image signal obtained from the separation in step S300. In the differential encoding, the image encoding unit 11 selectively uses two types of predictive values in accordance with the saturation determination result information. If the high-gain image signal in the same pixel as the image signal (pixel value) to be encoded is saturated, the image encoding unit 11 uses, as the predictive value, an already-encoded image signal (pixel value) at the same gain (i.e., the low gain) as a pixel different from the pixel in the image signal to be encoded. If the high-gain image signal in the same pixel as the image signal (pixel value) to be encoded is not saturated, the image encoding unit 11 uses, as the predictive value, a value obtained by performing gain ratio adjustment on the high-gain image signal. The processing in step S301 will be described in detail later with reference to FIG. 7B.

In step S304a, the variable-length encoding unit 307a performs variable-length encoding using, as an input, the result of the differential encoding on the low-gain image signal, which is the result of the processing of step S301. The details of step S304a are the same as step S204a, and will therefore not be described. The processing result of this step is used in the processing of step S305, which will be described later.

The branch for step S302 will be described next. In step S302, the image encoding unit 11 performs differential encoding of the image signal (pixel values) at the pixel level, for the high-gain image signal obtained from the separation in step S300. In differential encoding, the image encoding unit 11 uses an already-encoded image signal (pixel value) at the same gain (i.e., high gain) of a pixel different from the pixel of the image signal (pixel value) to be encoded as a predictive value. The processing in step S301 will be described in detail later with reference to FIG. 7C.

In step S304b, the variable-length encoding unit 307a performs variable-length encoding using, as an input, the result of the differential encoding on the high-gain image signal, which is the result of the processing of step S302. The details of step S304b are the same as step S204b, and will therefore not be described. The processing result of this step is used in the processing of step S305, which will be described later.

The branch for step S303 will be described last. In step S303, the image encoding unit 11 determines whether or not the high-gain image signal obtained from the separation in step S300 is saturated. The branch of step S303 then merges with the branch of step S301. The processing result of step S303 is then used in the processing of step S301. The processing in step S303 will be described in detail later with reference to FIG. 7D.

Following the processing of the above-described three branches, in step S305, the multiplexing unit 308 performs multiplexing processing using the result of the variable-length encoding of the low-gain image signal obtained in step S304a and the result of the variable-length encoding of the high-gain image signal obtained in step S304b as inputs. The processing in step S305 will be described in detail later with reference to FIG. 7E.

In step S307, the image encoding unit 11 performs a final pixel determination. In this step, the image encoding unit 11 determines whether or not the pixel processed in steps S300 to S305 is the final pixel in the image to be processed. If the pixel is the final pixel, the processing of this flowchart ends. If not, the image encoding unit 11 returns the processing step to step S300 and performs the same processing for the next pixel.

Figure 7B:
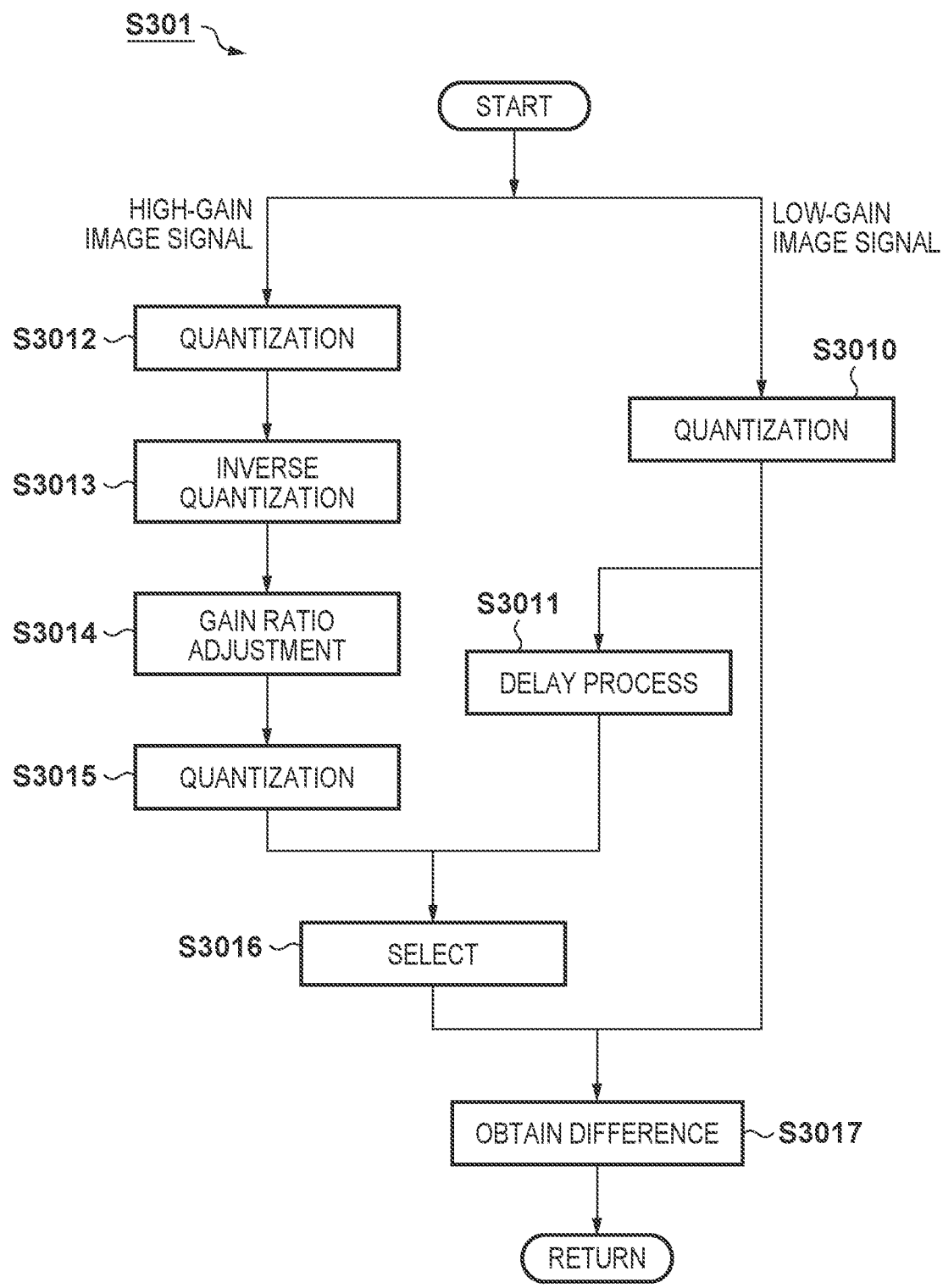
FIG. 7B is a flowchart illustrating details of processing performed in step S301 of FIG. 7A.

The processing of step S301 in FIG. 7A will be described in detail next with reference to FIG. 7B. The processing of step S301 splits into a branch for the high-gain image signal and a branch for the low-gain image signal at the starting point.

The branch for the low-gain image signal will be described first. In step S3010, the quantization unit 301a quantizes the low-gain image signal obtained in step S300 using a predetermined quantization step value and outputs a quantization result (the quantized low-gain image signal). The processing result of this step is used in the processing of step S3017 (described later) in addition to the processing of step S3011, which will be described next.

In step S3011, the delay unit 302a delays the quantized low-gain image signal output by the quantization unit 301a by a predetermined number of pixels, and outputs the result to a selector 309 as a delayed low-gain image signal. The details of step S3011 are the same as step S2011, and will therefore not be described. The processing result of this step is used in the processing of step S3016, which will be described later.

The branch for the high-gain image signal will be described next. In step S3012, the quantization unit 301b quantizes the high-gain image signal obtained in step S300 using a predetermined quantization step value and outputs a quantization result.

In step S3013, the inverse quantization unit 303 inverse-quantizes the quantized high-gain image signal obtained in step S3012. In the inverse quantization, the inverse quantization unit 303 uses the quantization step value used in step S3012. The inverse quantization unit 303 outputs a locally-decoded high-gain image signal value obtained from the inverse quantization. Doing so makes it possible to recover the same value on the decoding side.

In step S3014, the gain ratio adjustment unit 304 performs gain ratio adjustment on the locally-decoded high-gain image signal output by the inverse quantization unit 303, and outputs the result as the gain ratio-adjusted high-gain image signal. In the gain ratio adjustment processing, the gain ratio adjustment unit 304 finds a gain ratio R in accordance with whether the high-gain image signal and the low-gain image signal output by the image capturing unit 10 have been amplified by any rate (gain). Next, the gain ratio adjustment unit 304 obtains the gain ratio-adjusted high-gain image signal by multiplying the locally-decoded high-gain image signal which is input by the inverse of the gain ratio R. The method of calculating the gain ratio R is the same as in step S2022 and will therefore not be described.

In step S3015, the quantization unit 301c quantizes the gain ratio-adjusted high-gain image signal obtained in step S3014. The quantization unit 301c quantizes the gain ratio-adjusted high-gain image signal, which is the input, using the quantization step value used in step S3010. The quantization unit 301c outputs this quantization result as the quantized gain ratio-adjusted high-gain image signal.

In step S3016, the selector 309 selects one of the delayed low-gain image signal obtained in step S3011 and the quantized gain ratio-adjusted high-gain image signal obtained in step S3015 on the basis of the saturation determination result information obtained in step S303. The selector 309 selects the delayed low-gain image signal if the saturation determination result information indicates saturation, and selects the quantized gain ratio-adjusted high-gain image signal if not. The selector 309 outputs the selected image signal as the predictive value of the low-gain image signal.

Following the processing of the above-described two branches, in step S3017, the subtraction unit 305a subtracts the predictive value of the low-gain image signal selected in step S3016 from the quantized low-gain image signal obtained in step S3010, and outputs the result of the subtraction as the differential quantized low-gain image signal. This completes the differential encoding of step S301.

Figure 7C:
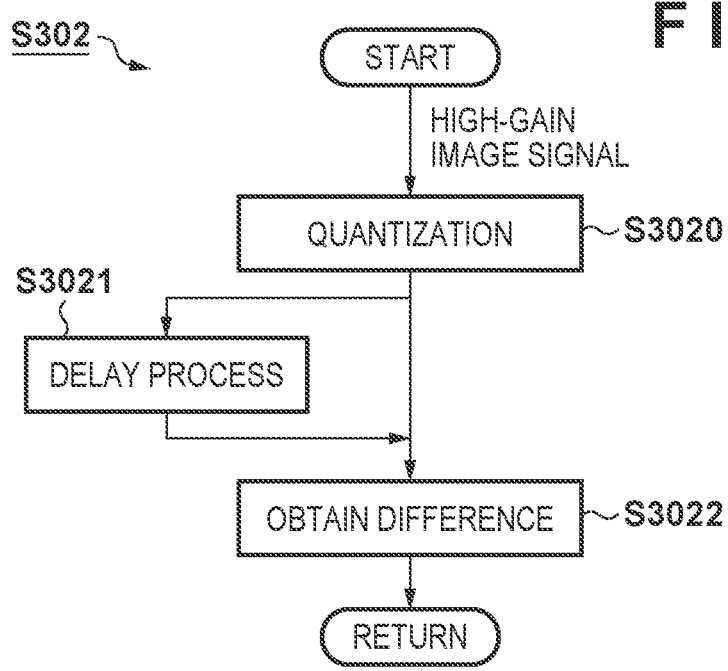
FIG. 7C is a flowchart illustrating details of processing performed in step S302 of FIG. 7A.

The processing of step S302 in FIG. 7A will be described in detail next with reference to FIG. 7C. In step S3020, the quantization unit 301b quantizes the high-gain image signal output by the distribution unit 300 using a predetermined quantization step value, and outputs a quantization result (the quantized high-gain image signal).

In step S3021, the delay unit 302b delays the quantized high-gain image signal output by the quantization unit 301b by a predetermined number of pixels, and outputs the result to the subtraction unit 305b as a predictive value of the high-gain image signal. The delay unit 302b is configured to delay by a predetermined number of pixels in order to generate, as the predictive value, a surrounding pixel value of the same gain (i.e., high gain) that has already been encoded. The details of step S3021 are the same as step S2011, and will therefore not be described.

In step S3022, the subtraction unit 305b subtracts the predictive value of the high-gain image signal obtained in step S3021 from the quantized high-gain image signal obtained in step S3020, and outputs the result of the subtraction as the differential quantized high-gain image signal. This completes the differential encoding of step S302.

Figure 7D:
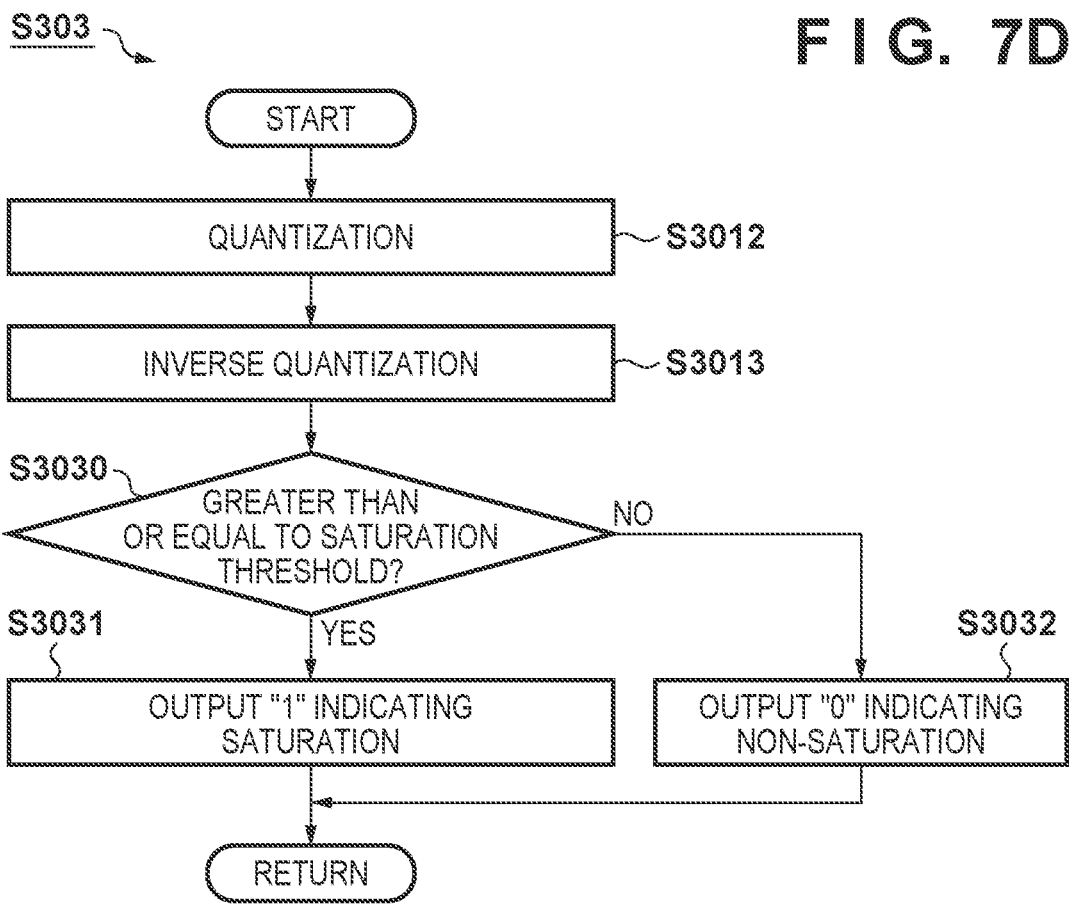
FIG. 7D is a flowchart illustrating details of processing performed in step S303 of FIG. 7A.

The processing of step S303 in FIG. 7A will be described in detail next with reference to FIG. 7D. The processing of steps S3012 and S3013 in FIG. 7D is the same as the processing of steps S3012 and S3013 in FIG. 7B. Although steps S3012 and S3013 are shown in FIG. 7D too for explanatory purposes, the processing of these steps is the same as the processing of steps S3012 and S3013 in FIG. 7B. Accordingly, the quantization unit 301b does not need to perform the processing of these two steps S3012 separately, and may perform a single instance of quantization processing as processing common to the two steps S3012. Likewise, the inverse quantization unit 303 does not need to perform the processing of these two steps S3013 separately, and may perform a single instance of inverse quantization processing as processing common to the two steps S3013.

In step S3030, the saturation determination unit 306 determines whether or not the corresponding high-gain image signal is saturated on the basis of the locally-decoded high-gain image signal obtained in step S3013. In the present embodiment, the differential encoding of the high-gain image signal is performed by using the high-gain image signal in a different pixel as the predictive value, regardless of the saturation determination result. The high-gain image signal can therefore be decoded independently. Accordingly, the saturation can be determined using the high-gain image signal on the decoding side as well. As such, the saturation determination unit 306 determines the saturation using the corresponding locally-decoded high-gain image signal. The saturation determination unit 306 determines that the corresponding high-gain image signal is saturated if the locally-decoded high-gain image signal is greater than or equal to a saturation threshold, and determines that the corresponding high-gain image signal is not saturated if the locally-decoded high-gain image signal is less than the saturation threshold. The processing moves to step S3031 if the high-gain image signal is saturated, and to step S3032 if not.

In step S3031, the saturation determination unit 306 outputs "1", which is a value indicating that the high-gain image signal is saturated, to the selector 309. In step S3032, the saturation determination unit 306 outputs "0", which is a value indicating that the high-gain image signal is not saturated, to the selector 309. This completes the saturation determination of step S303.

Figure 7E:
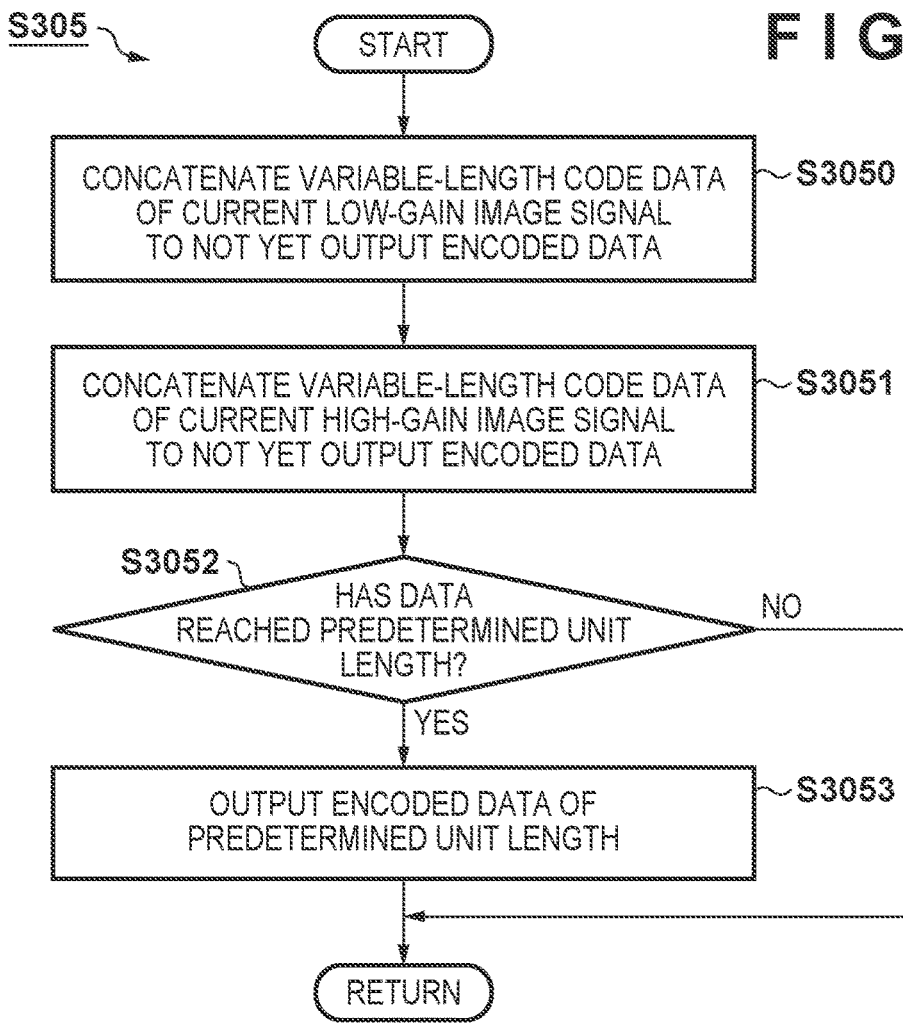
FIG. 7E is a flowchart illustrating details of processing performed in step S305 of FIG. 7A.

The processing of step S305 in FIG. 7A will be described in detail next with reference to FIG. 7E. In step S3050, the multiplexing unit 308 concatenates the variable-length code data of the current low-gain image signal obtained in step S304a to the end of the not yet output encoded data accumulated in the multiplexing unit 308 without gaps.

In step S3051, the multiplexing unit 308 concatenates the variable-length code data of the current high-gain image signal obtained in step S304b to the end of the not yet output encoded data accumulated in the multiplexing unit 308 without gaps.

In step S3052, the multiplexing unit 308 determines whether or not the not yet output encoded data accumulated in the multiplexing unit 308 has reached a predetermined unit length. The predetermined unit length is equal to, for example, the bit width of the encoded data output terminal of the image encoding unit 11. If the encoded data has reached the predetermined unit length, the processing moves to step S3053, and if not, the processing of this flowchart ends and the multiplexing of step S305 is complete.

In step S3053, the multiplexing unit 308 outputs the encoded data of the predetermined unit length at the beginning of the not yet output encoded data accumulated in the multiplexing unit 308. The multiplexing of step S305 is completed as a result.

In this manner, in step S305, the multiplexing unit 308 takes variable-length code data and concatenates that data in order with previously obtained data, and outputs the result as encoded data each time the data reaches the predetermined unit length.

As described thus far, according to the second embodiment, the image encoding unit 11 obtains a plurality of low-gain image signals (a plurality of first pixel values) and a plurality of high-gain image signals (a plurality of second pixel values) generated by the image capturing unit 10 and corresponding to a plurality of pixels. A relatively small gain (a first gain) is applied to each of the plurality of first pixel values, and a relatively large gain (a second gain) is applied to each of the plurality of second pixel values. Accordingly, there is correlation between the first pixel value and the second pixel value corresponding to the same pixel. The image encoding unit 11 encodes each of the plurality of first pixel values (a plurality of target pixel values) on the basis of the correlation with the second pixel value (a reference pixel value) corresponding to the same pixel among the plurality of second pixel values (a plurality of reference pixel values). As the encoding based on the correlation, the image encoding unit 11 performs differential encoding which uses, as a predictive value, a value obtained by performing gain ratio adjustment on the reference pixel value corresponding to the target pixel value. This makes it possible to encode efficiently.

Additionally, the image encoding unit 11 encodes each of the plurality of second pixel values (the plurality of reference pixel values) on the basis of the correlation with the second pixel value (the reference pixel value) corresponding to another pixel. As the encoding based on the correlation, the image encoding unit 11 performs differential encoding which uses, as a predictive value, the reference pixel value of a pixel different from the reference pixel value to be encoded. Through this, the second pixel value (the high-gain image signal) can be decoded without using the first pixel value (the low-gain image signal) on the decoding side. As such, the decoded second pixel value (high-gain image signal) can be used when generating the predictive value of the first pixel value (the low-gain image signal) on the decoding side.

Additionally, in the image encoding unit 11, when generating the predictive value of the low-gain image signal, using a value obtained by locally decoding the corresponding quantized high-gain image signal makes it possible to use the same predictive value on the decoding side as well.

Additionally, the image encoding unit 11 determines whether or not each of the plurality of high-gain image signals is saturated. For the low-gain image signal corresponding to the saturated high-gain image signal, the image encoding unit 11 performs encoding on the basis of the correlation with the low-gain image signal in another pixel, instead of the correlation with the high-gain image signal in the same pixel. This makes it possible to encode more efficiently. Additionally, the image encoding unit 11 determines the saturation using a value obtained by locally decoding the corresponding quantized high-gain image signal (a locally-decoded value). Through this, the same determination result can be calculated on the decoding side, and there is thus no need to include the determination result in the encoded data, making it possible to encode more efficiently.

Although like the first embodiment, the second embodiment describes a configuration in which the image encoding unit 11 performs quantization and inverse quantization processing, a configuration in which quantization and inverse quantization processing are not performed may be employed as well. In this case, the quantization unit 301*a*, the quantization unit 301*b*, the quantization unit 301*c*, and the inverse quantization unit 303 in FIG. 3 are not needed.

Third Embodiment

The first embodiment described a configuration in which the high-gain image signal (the second pixel value) is encoded on the basis of the correlation with the low-gain image signal (the first pixel value) in the same pixel. Additionally, the second embodiment described a configuration in which the low-gain image signal (the first pixel value) is encoded on the basis of the correlation with the high-gain image signal (the second pixel value) in the same pixel. In the following, the encoding method based on the configuration of the first embodiment will be called "method A", and the encoding method based on the configuration of the second embodiment will be called "method B".

The encoding efficiency when the high-gain image signal is saturated (called a "saturated state" hereinafter) is often better with method A than with method B. This is because in method A, no code at all is produced for the high-gain image signal during the saturated state.

On the other hand, the encoding efficiency when the high-gain image signal is not saturated (called an "unsaturated state" hereinafter) is often worse with method A than with method B. This is because in method A, the predictive value used in the encoding of the high-gain image signal during the unsaturated state is generated by multiplying the corresponding low-gain image signal by the gain ratio R, which results in the obtained predictive value taking on jumpy values. In comparison, in method B, during the unsaturated state, the predictive value used in the encoding of the low-gain image signal is generated by multiplying the corresponding high-gain image signal by the inverse of the gain ratio R, providing a relatively higher prediction accuracy than method A without the predictive value taking on jumpy values. However, in method B, some code is produced in both the low-gain image signal and the high-gain image signal during the saturated state, which means that the encoding efficiency is often lower than with method A. Conversely, method B has a relatively high prediction accuracy during the unsaturated state as mentioned above, and can therefore be expected to provide better encoding efficiency than method A.

As described above, it can be said that which of method A and method B is suitable for encoding depends on the state of the image signal. In light of these circumstances, it is more advantageous, from the standpoint of encoding efficiency, to provide both method A and method B and perform the encoding while selecting the appropriate method, than to provide only one of the methods. Accordingly, the third embodiment will describe a configuration in which an image encoding unit corresponding to method A and an image encoding unit corresponding to method B are both provided, and encoding is performed while switching between the two as appropriate.

Note that in the third embodiment, the basic configuration of the image processing apparatus 100 is the same as in the first embodiment and the second embodiment (see FIG. 1). The following will primarily describe areas that are different from the first embodiment and the second embodiment.

FIG. 4 is a function block diagram illustrating the image encoding unit 11 according to the third embodiment. Note that of the blocks included in the image encoding unit 11 in FIG. 4, blocks having the same configuration as in the image encoding unit 11 in FIG. 2 (the first embodiment) or the image encoding unit 11 in FIG. 3 (the second embodiment) will not be described.

A distribution unit 400 takes the image signal output from the image capturing unit 10 and separates the image signal into a high-gain image signal and a low-gain image signal. The distribution unit 400 outputs both the high-gain image signal and the low-gain image signal to an image encoding unit 11*a* and an image encoding unit 11*b*. The details of the distribution unit 400 are the same as the distribution unit 200 and will therefore not be described.

The image encoding unit 11*a* is the same as the image encoding unit 11 described in the first embodiment (FIG. 2). The image encoding unit 11*a* will therefore not be described in detail.

The image encoding unit 11*b* is the same as the image encoding unit 11 described in the second embodiment (FIG. 3). The image encoding unit 11*b* will therefore not be described in detail.

An encoding method determination unit 401 obtains, for each of image blocks, encoded data output by the image encoding unit 11*a* and the image encoding unit 11*b*, and determines which encoding method is better. The encoding method determination unit 401 outputs the result of the determination to a selector 402 and a multiplexing unit 403 as encoding method selection information. The encoding method determination unit 401 compares the sizes of one image block's worth of the encoded data output by the image encoding unit 11*a* and the image encoding unit 11*b*, respectively, and determines to use the encoding method corresponding to the encoded data having a smaller data size.

In accordance with the encoding method selection information output by the encoding method determination unit 401, the selector 402 selects the output of the image encoding unit 11*a* or the image encoding unit 11*b* that corresponds to the encoding method selection information, and outputs the selected output to the multiplexing unit 403.

The multiplexing unit 403 adds the encoding method selection information output by the encoding method determination unit 401 to the encoded data output by the selector 402 in units of image blocks, and outputs the result as final encoded data.

As described thus far, according to the third embodiment, the image encoding unit 11 selectively outputs the one of the encoded data generated through method A (first encoded data) and the encoded data generated through method B (second encoded data) that has the smaller data size. This makes it possible to encode even more efficiently.

The foregoing descriptions assume that the image encoding unit 11 divides the plurality of pixels generated by the image capturing unit 10 into a plurality of pixel blocks and selectively outputs the first encoded data or the second encoded data in units of pixel blocks. However, the image encoding unit 11 may selectively output the first encoded data or the second encoded data in units of the entire image, without dividing the image into a plurality of pixel blocks.

Fourth Embodiment

The third embodiment described a configuration in which the encoding method which is ultimately used is determined by comparing the size of the encoded data corresponding to method A with the size of the encoded data corresponding to method B. The fourth embodiment will describe another method for determining the encoding method.

Note that in the fourth embodiment, the basic configuration of the image processing apparatus 100 is the same as in the first to third embodiments (see FIG. 1). The following will primarily describe areas that are different from the first to third embodiments.

FIG. 5 is a function block diagram illustrating the image encoding unit 11 according to the fourth embodiment. Note that of the blocks included in the image encoding unit 11 in FIG. 5, blocks having the same configuration as in the image encoding unit 11 in FIG. 2 (the first embodiment), the image encoding unit 11 in FIG. 3 (the second embodiment), or the image encoding unit 11 in FIG. 4 (the third embodiment) will not be described.

A distribution unit 500, the image encoding unit 11a, the image encoding unit 11b, a selector 502, and a multiplexing unit 503 are the same as the distribution unit 400, the image encoding unit 11a, the image encoding unit 11b, the selector 402, and the multiplexing unit 403, respectively, in the third embodiment (FIG. 4), and will therefore not be described.

An encoding method determination unit 501 obtains the high-gain image signal output by the distribution unit 500 for each of image blocks, and determines which of method A and method B is better as the encoding method for each image block. The encoding method determination unit 501 then outputs the result of the determination to the selector 502 and the multiplexing unit 503 as encoding method selection information. The encoding method determination unit 501 determines whether or not the number of saturated pixel value included in the plurality of pixel values of the image block is more than a criterion (e.g., determines whether or not the ratio of the number of saturated high-gain image signals (saturated pixels) in the pixel block is greater than a predetermined threshold). The encoding method determination unit 501 selects method A if the ratio of the number of saturated high-gain image signals (saturated pixels) in the pixel block is greater than the predetermined threshold, and selects method B if not. This is a determination method conceived of in light of the fact that, as described in the third embodiment, the encoding efficiencies of method A and method B are highly correlated with whether or not the high-gain image signal is saturated, and in general, method A is better when there is a higher saturated state and method B is better when the opposite is true.

As described thus far, according to the fourth embodiment, the image encoding unit 11 selects method A or method B according to whether or not the number of saturated pixel values included in the plurality of pixel values is more than a criterion. This makes it possible to encode even more efficiently.

Note that the image encoding unit 11 may selectively output the first encoded data (the encoded data generated through method A) or the second encoded data (the encoded data generated through method B) in units of the entire image, without dividing the image into a plurality of pixel blocks.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016887, filed Feb. 4, 2021 which is hereby incorporated by reference herein in its entirety.

What is claimed is:

1. An encoding apparatus comprising:
    a memory and at least one processor which function as a plurality of units comprising:
    (1) an obtaining unit configured to obtain a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and
    (2) an encoding unit configured to (a) encode the plurality of first pixel values and the plurality of second pixel values, respectively, the plurality of first pixel values and the plurality of second pixel values corresponding to a same plurality of pixels, and (b) output the plurality of first pixel values that have been encoded and the plurality of second pixel values that have been encoded,
    wherein the encoding unit; (a) encodes each pixel of one plurality of pixel values of (i) the plurality of first pixel values and (ii) the plurality of second pixel values on the basis of a correlation with a reference pixel value corresponding to a same pixel among another plurality of pixel values of (i) the plurality of first pixel values and (ii) the plurality of second pixel values; and (b) encodes each pixel of the another plurality of pixel values based on the another plurality of pixel values, not based on the one plurality of pixel values.

2. The encoding apparatus according to claim 1, wherein encoding each pixel of the one plurality of pixel values on the basis of the correlation with the reference pixel value corresponding to the same pixel among the another plurality of pixel values includes calculating a difference from a corresponding predictive value for each pixel of the one plurality of pixel values, and wherein the corresponding predictive value is based on the reference pixel value corresponding to the same pixel, and a ratio of the first gain to the second gain.

3. The encoding apparatus according to claim 1, wherein the encoding unit encodes each pixel of the another plurality of pixel values on the basis of a correlation with a reference pixel value corresponding to another pixel of the another plurality of pixel values.

4. The encoding apparatus according to claim 3, wherein the encoding unit generates encoded data including code generated by encoding the one plurality of pixel values and the another plurality of pixel values, and wherein in a case where the another plurality of pixel values is the plurality of first pixel values and the one plurality of pixel values is the plurality of second pixel values, the encoding unit:
(a) determines whether or not each of the one plurality of pixel values is saturated; and
(b) performs control such that code corresponding to a pixel value that is saturated among the one plurality of pixel values is not included in the encoded data.

5. The encoding apparatus according to claim 4, wherein the determining of whether or not each of the one plurality of pixel values is saturated is performed using a value obtained by adjusting a locally-decoded value of each of the another plurality of pixel values using the ratio of the first gain to the second gain.

6. The encoding apparatus according to claim 3, wherein in a case where the another plurality of pixel values is the plurality of second pixel values and the one plurality of pixel values is the plurality of first pixel values, the encoding unit:
(a) determines whether or not each of the another plurality of pixel values is saturated; and (b) with respect to a pixel value, among the one plurality of pixel values, that corresponds to a reference pixel value determined to be saturated, performs encoding on the basis of a correlation with a pixel value corresponding to another pixel of the one plurality of pixel values.

7. The encoding apparatus according to claim 6, wherein the determining of whether or not each of the another plurality of pixel values is saturated is performed using a locally-decoded value of each of the another plurality of pixel values.

8. The encoding apparatus according to claim 3, wherein the encoding unit: (a) generates first encoded data including code generated by encoding the one plurality of pixel values and the another plurality of pixel values, using the plurality of first pixel values as the another plurality of pixel values and the plurality of second pixel values as the one plurality of pixel values; and (b) generates second encoded data including code generated by encoding the another plurality of pixel values and the one plurality of pixel values, using the plurality of second pixel values as the another plurality of pixel values and the plurality of first pixel values as the one plurality of pixel values, and wherein the encoding apparatus selectively outputs one of the first encoded data and the second encoded data having a smaller data size.

9. The encoding apparatus according to claim 3, wherein the encoding unit:
determines whether or not a number of saturated pixel values included in the plurality of second pixel values is more than a criterion;

in a case where the number of saturated pixel values included in the plurality of second pixel values is more than the criterion, generates first encoded data including code generated by encoding the one plurality of pixel values and the another plurality of pixel values, using the plurality of first pixel values as the another plurality of pixel values and the plurality of second pixel values as the one plurality of pixel values;

in a case where the number of saturated pixel values included in the plurality of second pixel values is not more than the criterion, generates second encoded data including code generated by encoding the another plurality of pixel values and the one plurality of pixel values, using the plurality of second pixel values as the another plurality of pixel values and the plurality of first pixel values as the one plurality of pixel values; and selectively outputs the first encoded data in the case where the number of saturated pixel values included in the plurality of second pixel values is more than the criterion, and the second encoded data in the case where the number of saturated pixel values included in the plurality of second pixel values is not more than the criterion.

10. The encoding apparatus according to claim 8, wherein in a case where the plurality of first pixel values is used as the another plurality of pixel values and the plurality of second pixel values is used as the one plurality of pixel values, the encoding unit performs control such that the first encoded data does not include code corresponding to a pixel value that is saturated among the one plurality of pixel values.

11. The encoding apparatus according to claim 8, wherein the encoding unit divides the plurality of pixels into a plurality of pixel blocks, and selectively outputs the first encoded data or the second encoded data in units of the pixel blocks.

12. The encoding apparatus according to claim 1, wherein the one plurality of pixel values is the plurality of first pixel values, and wherein the another plurality of pixel values is the plurality of second pixel values.

13. The encoding apparatus according to claim 1, wherein the one plurality of pixel values is the plurality of second pixel values, and wherein the another plurality of pixel values is the plurality of first pixel values.

14. An encoding method executed by an encoding apparatus, the method comprising:
obtaining a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and
encoding the plurality of first pixel values and the plurality of second pixel values, respectively, the plurality of first pixel values and the plurality of second pixel values corresponding to a same plurality of pixels; and
outputting the plurality of first pixel values that have been encoded and the plurality of second pixel values that have been encoded,
wherein the encoding comprises (a) encoding each pixel of of one plurality of pixel values of (i) the plurality of first pixel values and (ii) the plurality of second pixel values on the basis of a correlation with a reference pixel value corresponding to a same pixel among another plurality of pixel values of (i) the plurality of first pixel values and (ii) the plurality of second pixel values; and (b) encoding each pixel of the another plurality of pixel values based on the another plurality of pixel values, not based on the one plurality of pixel values.

15. The method according to claim 14, wherein the one plurality of pixel values is the plurality of first pixel values, and wherein the another plurality of pixel values is the plurality of second pixel values.

16. The method according to claim 14, wherein the one plurality of pixel values is the plurality of second pixel values, and wherein the another plurality of pixel values is the plurality of first pixel values.

17. A non-transitory computer-readable storage medium which stores a program for causing a computer to execute an encoding method, the method comprising:

obtaining a plurality of first pixel values and a plurality of second pixel values generated by an image sensor and corresponding to a plurality of pixels, a first gain being applied to each of the plurality of first pixel values and a second gain greater than the first gain being applied to each of the plurality of second pixel values; and encoding the plurality of first pixel values and the plurality of second pixel values, respectively, the plurality of first pixel values and the plurality of second pixel values corresponding to a same plurality of pixels; and outputting the plurality of first pixel values that have been encoded and the plurality of second pixel values that have been encoded, wherein the encoding comprises (a) encoding each pixel of of one plurality of pixel values of (i) the plurality of first pixel values and (ii) the plurality of second pixel values on the basis of a correlation with a reference pixel value corresponding to a same pixel among another plurality of pixel values of (i) the plurality of first pixel values and (ii) the plurality of second pixel values; and (b) encoding each pixel of the another plurality of pixel values based on the another plurality of pixel values, not based on the one plurality of pixel values.

18. The medium according to claim 17, wherein the one plurality of pixel values is the plurality of first pixel values, and wherein the another plurality of pixel values is the plurality of second pixel values.

19. The medium apparatus according to claim 17, wherein the one plurality of pixel values is the plurality of second pixel values, and wherein the another plurality of pixel values is the plurality of first pixel values.

* * * * *